(12) United States Patent
Janssen et al.

(10) Patent No.: US 6,777,055 B2
(45) Date of Patent: Aug. 17, 2004

(54) PROTECTIVE ARTICLE HAVING REMOVABLE SHEETS AND VERTICALLY STAGGERED SIDE EDGE, SUBSTRATES PROTECTED THEREWITH, AND A METHOD OF USE

(75) Inventors: Jeffrey R. Janssen, Woodbury, MN (US); William F. Sheffield, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/685,329

(22) Filed: Oct. 14, 2003

(65) Prior Publication Data

US 2004/0121105 A1 Jun. 24, 2004

Related U.S. Application Data

(63) Continuation of application No. 09/604,475, filed on Jun. 27, 2000, now abandoned.

(51) Int. Cl.[7] .......................... B32B 17/10; B32B 27/00
(52) U.S. Cl. .................... 428/41.8; 428/40.1; 428/41.7; 428/42.2; 428/42.3; 428/343; 428/192; 296/95.1; 296/96.22
(58) Field of Search .............................. 428/40.1, 41.7, 428/41.8, 42.2, 42.3, 192, 343; 296/95.1, 96.22

(56) References Cited

U.S. PATENT DOCUMENTS

| | | | |
|---|---|---|---|
| 3,785,102 A | 1/1974 | Amos | |
| 4,090,464 A | 5/1978 | Bishopp et al. | |
| 4,161,176 A | 7/1979 | Harris, II et al. | |
| 4,301,193 A | 11/1981 | Zuk | |
| 4,332,861 A | 6/1982 | Franz et al. | |
| 4,842,919 A | 6/1989 | David et al. | |
| 5,002,326 A | 3/1991 | Westfield et al. | |
| 5,104,929 A | 4/1992 | Bilkadi | |
| 5,194,293 A | 3/1993 | Foster | |
| 5,443,877 A | 8/1995 | Kramer et al. | |
| 5,512,116 A | 4/1996 | Campfield | |
| 5,592,698 A | 1/1997 | Woods | |
| 5,633,049 A | 5/1997 | Bilkadi et al. | |
| 5,792,535 A | 8/1998 | Weder | |

FOREIGN PATENT DOCUMENTS

| | | |
|---|---|---|
| DE | 36 37 188 A1 | 5/1988 |
| EP | 0 671 258 A2 | 9/1995 |
| GB | 2310862 | 9/1997 |
| JP | 62-53832 | 9/1994 |
| JP | HEI 10-167765 | 6/1998 |
| WO | WO 00/24575 | 5/2000 |
| WO | WO 00/24576 | 5/2000 |

OTHER PUBLICATIONS

JP 62–53–832 English Abstract, 1987.
Research Disclosure 24109 (May 1984).
Boor, *Ziegler–Natta Catalysts and Polymerizations*, "Polymerization of Monomers," Ch. 19, pp. 512–562, Academic, 1979.

(List continued on next page.)

*Primary Examiner*—Harold Pyon
*Assistant Examiner*—Brian P. Egan

(57) ABSTRACT

This invention relates to an article comprising a transparent stack of sheets that may be applied, for example, to protect substrates such as glass or plastic windows, signage or displays. The stack of sheets has a vertically staggered side edge which allows for easy identification of the topmost sheet in the stack for removal therefrom from the stack of sheets. The topmost sheet can be peeled away after it is damaged to reveal an undamaged sheet below. The invention also relates to the protected substrates and a method of protecting substrates such as glass or plastic windows, signage and displays from vandalism or other surface damage by adhering the stack of sheets to the substrate to be protected and subsequently pulling a topmost sheet away from the stack after it becomes damaged.

23 Claims, 11 Drawing Sheets

OTHER PUBLICATIONS

ASTM D882–97 Standard Test Method for Tensile Properties of Thin Plastic Sheeting.

ASTM D1003–97 Standard Test Method for Haze and Luminous Transmittance of Transparent Plastics.

ASTM D1044–94 Standard Test Method for Resistance of Transparent Plastics to Surface Abrasion.

Transit Cooperative Research Program, Transportation Research Board, National Research Council, *Enhancement of Vehicle Window Glazing for Vandal Resistance and Durability*, UDR–TR–95–119, Chapters 1–3, pp. 1–11, University of Dayton Research Institute, Mar. 1996.

Transit Cooperative Research Program, Transportation Research Board, National Research Council, *Procurement Specification Guidelines for Mass Transit Vehicle Window Glazing*, UDR–TR–95–114, University of Dayton Research Institute, Mar. 1996.

*3M™ Pat It™ Lint and Pet Hair Remover 836–D*, http://www.mmm.com/market/omc/catalog/products/p00/p21/p23.html, Sep. 1. 1998.

*The Word Is Out*, Product Data Sheet 70–0705–7091–9 (75.5)CG, 3M, 1995.

*New 3M Pat–it™ Pet Hair Remover*, Product Data Sheet 70–0705–7038–0(524)BE, 3M, 1994.

*3M Pat–it™ Lint and Pet Hair Remover*, Product Data Sheet 70–0705–0819–0, 3M, 1996.

*3M™ Scotchtint™ Sun Control Window Film*, 70–0703–7229–0, Sep. 1996.

*3M Scotchlite™ Premium Protective Overlay Film Series*, Product Data Sheet 1160 75–0300–4984–7(117.5)ii, 3M, Nov., 1997.

PROTECTIVE ARTICLE HAVING REMOVABLE SHEETS AND VERTICALLY STAGGERED SIDE EDGE, SUBSTRATES PROTECTED THEREWITH, AND A METHOD OF USE

CROSS REFERENCE TO RELATED APPLICATIONS

This application is a continuation of U.S. application Ser. No. 09/604,475, filed Jun. 27, 2000 now abandoned the disclosure of which is herein incorporated by reference.

FIELD

This invention relates to an article comprising a stack of sheets that may be applied, for example, to protect substrates such as glass or plastic windows, signage or displays.

BACKGROUND

Windows and glass in public transportation vehicles such as buses or subway trains can be subjected to a tremendous amount of abuse. The windows can be damaged by both incidental scratching during cleaning or they can be maliciously damaged by vandalism. Vandals damage the windows by scratching or abrading the surface of the window with items such as lava rock, diamonds, abrasive papers or abrasive cloths. Vandals can also damage the window by painting or coloring the surface of the window. Cleaning processes have been defined to eliminate damage by painting or coloring. However, scratching of glass by vandals presents a significant problem. In one major city, for example, approximately 40 percent of the bus windows have been vandalized by scratching and close to 80 percent of the subway train windows. The public transportation officials now call this type of graffiti "scratchiti". The best approach to stopping graffiti historically has been to remove the graffiti immediately once it appears. This graffiti prevention system which is known as "zero tolerance", has been extremely successful in eliminating the written and painted vandalism. Scratched glass, however, is extremely difficult and expensive to repair and as a result, the zero tolerance approach to scratchiti prevention and elimination is cost prohibitive. The vandalism issue tarnishes the overall image of an entire city's transportation system. The vandalized glass leads to lower ridership because of the reduced perception of safety on the vehicle by the public. The vandalism ultimately leads to lost revenue for the public transportation system and substantially high repair costs.

Several approaches have been evaluated to combat the scrachiti problem. The first approach has been to repair the glass by a multi-step abrasion/polishing method to remove the scrachiti. The abrasion steps remove glass to the depth of the scratch with diamond abrasives and then with subsequently finer grades of diamond or aluminum oxide abrasives the surface of the glass is polished to its original appearance. The abrasive materials are expensive and the time required to completely abrade and polish the surface of the glass can be several hours depending on the depth of the damaged areas.

A second approach to eliminating the problem has been to apply a single permanent adhesive coated polyester sheet onto the surface of the window. The polyester sheet is thick enough to protect the window from scratching by diamonds, lava rocks and most abrasives. The sheet is typically applied onto the glass with a water solution to eliminate any trapped air. The application process takes about 5 to 10 minutes to complete. The sheet does a good job of protecting the window from most of the damage but the sheet is readily damaged and the damage is visible to the passengers. Removing the sheet is very time consuming taking about 15 to about 60 minutes depending on the amount of residue left on the window after removal of the sheet. Once the damaged sheet is removed, a new permanent adhesive coated polyester sheet needs to be applied. The time required to remove the adhesive coated polyester sheet, remove the adhesive residue from the glass, and apply a new permanent adhesive coated polyester sheet and reinstall the window can be close to 2 hours. Examples of single permanent adhesive coated polyester sheets which can be used to protect a window are 3M™ Scotchshield™ Safety and Security Window Film and 3M™ Sun Control Window Films, data sheet number 70-0703-7220-0 published in September 1996 by the 3M Company.

The replaced sheet can be quickly damaged once the vehicle is used again in public thus necessitating another costly and time consuming replacement.

The third approach commonly used to repair and protect windows from scratches is to coat the damaged window with an epoxy coating. (*Enhancement of Vehicle Glazing for Vandal Resistance and Durability*, by Daniel R. Bowman, Mar. 25, 1996, available from the United States Transportation Research Board). The damaged window is typically first scrubbed clean before coating with an epoxy coating. The epoxy coating can be used to fill the defects on the windows and restore the window to a state of clarity where signs can be read through the window. To apply the coating, the window must be removed from the vehicle and the window must be cleaned and primed. The coatings are applied and cured in a clean environment. The coatings currently available however are easily scratched by the same method used to scratch the glass. Once the coating is damaged, it is difficult to apply a subsequent coating due to poor adhesion of the coating to the first layer. The process to replace the damaged coating with a new coating is time consuming and expensive.

Another approach to the problem is to apply a sacrificial window as a shield over an original non-damaged window. The vehicle's window is modified with a frame that has a channel designed for a sheet of polycarbonate or acrylic. The rigid self-supporting sheet is inserted into the channel and acts as a barrier to damage on the base window. The polycarbonate sheet can be easily scratched by intentional methods being used to scratch the glass. This approach requires extensive modification to the window frame. Furthermore, the material cost per repair can be excessive making this approach cost prohibitive.

U.S. Pat. No. 3,785,102 discloses a pad comprising a plurality of very thin polyethylene or polypropylene removable sheets, each sheet bearing a very thin coating of pressure sensitive adhesive on its top surface for removing dirt from shoes and an adhesive at the bottom surface so that each successive layer is removably adhered to successive bottom layers and eventually to the floor. There is no discussion regarding the clarity of such a pad.

3M Masking and Packaging Systems Division sells a stack of sheets with adhesive that removes lint and pet hair under the trade names Pat It™ Lint and Pet Hair Remover, product data sheet numbers 70-0705-7091-9, 70-0705-0819-0 and 70-0705-7038-0 published by 3M Company in 1994.

Research Disclosure 24109 (May 1984) discloses transmissive strippable plastic sheets stacked on mirror surfaces or stacked reflective (mirror surfaced) strippable plastic sheets that can be removed successively as toner or dust build up on the mirrors used in the optical imaging systems of electrophotographic reproduction apparatus occurs. The adhesive joining the layers to one another are provided only about the border areas of the sheets which are outside the optical image path to minimize image quality losses.

JP 10167765A describes a method of cleaning windows by the application of an optically clear sheet of plastic film on the inner and outer surface of the glass. The film is comprised of polyvinyl chloride, polyacrylic acid, polyester or polycarbonate. The plastic film is thin and only a single sheet of plastic is described on each side of the glass. The sheet is removed when the sheet becomes soiled.

U.S. Pat. No. 5,592,698 discloses a tear away lens stack for maintaining visibility through a transparent protective eye and face shield of a racing vehicle drivers helmet which includes a tab portion having projections formed thereon to assist in grasping the tab portion for rapid tear away. No adhesive is used in the stack; rather the lenses are clipped together.

SUMMARY

The present invention provides an article comprising a stack of sheets wherein the sheets are designed to be removable from each other such that a fresh sheet can be exposed after a topmost sheet above is damaged and then removed. The stack of sheets includes a vertically staggered side edge that aids in the identification of the topmost sheet in the stack for removal thereof from the stack of sheets. The stack can be applied, for example, to the interior of bus or train windows to provide protection for the windows. As a sheet is damaged by graffiti artists, the topmost sheet of the article can be removed by trained maintenance personnel to reveal a clean undamaged sheet below.

The present invention provides an article comprising:
a stack of sheets, wherein each sheet independently comprises:
(a) a film, the film having a first side having a surface area, an opposite second side surface having a surface area;
(b) a bonding layer having a first side having a surface area and an opposite second side having a surface area, wherein the bonding layer is bonded via its first side to the second side of the film such that at least a center of the surface area of the second side of the film is in contact with the bonding layer, wherein at least about 50 percent of the surface area of the second side of the film has the bonding layer bonded thereto;
(c) an optional release layer coated on the first side of the film;
wherein each sheet is stacked upon another sheet such that except for a bottom sheet of the stack of sheets, the bonding layer of a sheet is in contact with the film or release layer, if present, of a sheet below;
wherein at least a portion of the side edges of the sheets are disposed in a vertically staggered arrangement with respect to one another thereby forming a vertically staggered side edge, and wherein the vertically staggered side edge includes indexing surfaces which allow for identification of a single sheet;
wherein a topmost sheet can be removed from the stack of sheets by pulling it away from the stack such that the sheet being removed from the stack as well as the sheets remaining with the stack do not delaminate;
wherein the stack of sheets when subjected to a visual acuity test using a 3 meter Snellen eye chart can allow an observer with 6 meter/6 meter vision to read a line on the eye chart which is indicative of about 6 meter/9 meter vision or better.

In a preferred embodiment of the article of the invention the article when subjected to a visual acuity test using a 3 meter Snellen eye chart can allow an observer with 6 meter/6 meter vision to read the line on the eye chart which is indicative of about 6 meter/6 meter vision or better.

In a preferred embodiment the first side of the film is not bonded to a bonding layer of the same sheet. In other words, preferably each sheet has a bonding layer coated on the second side of the film only.

In a preferred embodiment of the article of the invention the bonding layer is continuous.

In a preferred embodiment, the article of the invention when subjected to a 180° Peel Adhesion to Glass test leaves substantially no residue (more preferably no residue) on the glass.

In a preferred embodiment of the article of the invention the stack of sheets is transparent.

In a preferred embodiment of the article of the invention each sheet has a penetration resistance of at least about 0.5 kg, even more preferably at least about 1 kg, even more preferably at least about 2 kg, even more preferably at least about 2.5, even more preferably at least about 3 kg, even more preferably at least about 3.5 kg, and most preferably about 4 kg.

With respect to the article of the invention preferably the maximum haze value of the stack of sheets is less than about 10 percent, more preferably less than about 5 percent, and most preferably less than about 3 percent.

In a preferred embodiment of the article of the invention at least about 80 percent (more preferably at least about 90 percent, and most preferably about 100 percent) of the surface area of the second side of the film has the bonding layer bonded thereto.

Preferably the article of the invention comprises at least about 2 sheets, more preferably about 3 to about 10 sheets.

In a preferred embodiment of the article of the invention the release layer is present and the release layer of each sheet has a Taber abrasion resistance of about 25 percent or less, more preferably about 10 or less, and most preferably about 2 or less according to ASTM D1044-76 after 100 cycles.

In a preferred embodiment of the article of the invention the bonding layer comprises a material selected from the group consisting of acrylics, rubbers, polyolefins, and mixtures thereof.

In a preferred embodiment of the article of the invention the bonding layer comprises a pressure sensitive adhesive.

In a preferred embodiment of the article of the invention the bonding layer has a thickness ranging from about 5 to about 150 microns, more preferably about 10 to about 25 microns.

In a preferred embodiment of the article of the invention the film has a thickness ranging from about 25 to about 4000 microns, more preferably about 50 to about 1000 microns.

In a preferred embodiment of the article of the invention the film comprises a material selected from the group consisting of polyester, polycarbonate, acrylic, polyurethanes, poly acetyl, polyolefin based ionomers, ethylene vinyl acetate polymers, polyethylene, polypropylene, polyvinyl chloride, polystyrene, urethane acrylate polymers, epoxy polymers, epoxy acrylate polymers, and blends thereof.

In a preferred embodiment of the article of the invention the film further comprises of an additive selected from the group consisting of ultraviolet light absorbers, ultraviolet light stabilizers, flame retardants, smoke suppressants, antioxidants, and mixtures thereof.

In a preferred embodiment of the article of the invention the film comprises multiple layers.

In a preferred embodiment of the article of the invention each sheet has a tensile strength of about 20 to about 2000 kP, an elongation of about 5 to about 1000% and a tear strength of about 0.05 to about 5 kg. Even more preferably each sheet has a tensile strength of about 70 to about 1400 kP, an elongation of about 5 to about 500% and a tear strength of about 0.5 to about 2.5 kg. Most preferably each sheet has a tensile strength of about 350 to about 1000 kP, an elongation of about 20 to about 100% and a tear strength of about 1.5 to about 2.5 kg.

In a preferred embodiment of the article of the invention the release layer is present.

In a preferred embodiment of the article of the invention the release layer has a thickness ranging from about 0.1 to about 25 microns, more preferably about 2.5 to about 5 microns.

In a preferred embodiment of the article of the invention the release layer comprises a material selected from the group consisting of acrylates, methacrylates, urethanes, silicones, polyolefins, fluorocarbons and mixtures thereof.

In a preferred embodiment of the article of the invention the bonding layer of each sheet further comprises a component selected from the group consisting of flame retardants, smoke suppressants, antioxidants ultraviolet light absorbers, ultraviolet light stabilizers, and mixtures thereof.

In a preferred embodiment of the article of the invention the sheets are rectangular sheets of the same length and width.

In a preferred embodiment of the article of the invention the vertically staggered side edge is located at an edge of said article.

In a preferred embodiment of the article the vertically staggered side edge is located at a corner of said article.

In a preferred embodiment of the article the indexing surfaces have a shape selected from the group consisting of crescent shaped, rectangular, semicircular, and trapezoidal.

In a preferred embodiment of the article of the vertically staggered side edge is positioned at a corner of said article and the indexing surfaces are crescent shaped having one concave edge and one convex edge.

In a preferred embodiment of the article the vertically staggered side edge has a width ranging from about 0.5 mm to 25 mm and has a length ranging from about 25 mm to about 50 cm although the length of the vertically staggered side edge may also extend along the entire length of an edge of the article.

In a preferred embodiment of the article the vertically staggered side edge is in a staircase configuration or a reverse staircase configuration.

The present invention also provides a construction comprising:

(i) an article comprising:
a stack of sheets, wherein each sheet independently comprises:
(a) a film, the film having a first side having a surface area and an opposite second side having a surface area;
(b) a bonding layer having a first side having a surface area and an opposite second side having a surface area, wherein the bonding layer is bonded via its first side to the second side of the film such that at least a center of the surface area of the second side of the film is in contact with the bonding layer, wherein at least about 50 percent of the surface area of the second side of the film has the bonding layer bonded thereto, wherein with respect to each sheet the first side of the film is not bonded to a bonding layer of the same sheet;
(c) an optional release layer coated on the first side of the film;
wherein each sheet is stacked upon another sheet such that except for a bottom sheet of the stack of sheets, the bonding layer of a sheet is in contact with the protective film or release layer, if present, of a sheet below;
wherein at least a portion of the side edges of the sheets are disposed in a vertically staggered arrangement with respect to one another thereby forming a vertically staggered side edge, and wherein the vertically staggered side edge includes indexing surfaces which allow for identification of a single sheet;
wherein a topmost sheet can be removed from the stack of sheets by pulling it away from the stack such that the sheet being removed from the stack as well as the sheets remaining with the stack do not delaminate;
wherein the stack of sheets when subjected to a visual acuity test using a 3 meter Snellen eye chart can allow an observer with 6 meter/6 meter vision to read a line on the eye chart which is indicative of about 6 meter/12 meter vision or better; and (ii) a substrate to which the article is bonded via the bonding layer of the bottom sheet.

In a preferred embodiment of the article of the invention the substrate comprises a material selected from the group consisting of glass, metal, plastic, painted surfaces, wood, fabric, wallpaper, ceramic, concrete, mirrored surfaces, plastic/glass laminates, and combinations thereof.

In a preferred embodiment of the article of the invention the substrate is part of a structure. Most preferably the structure is selected from the group consisting of windows, walls, partitions, signs, bill boards, artwork, buildings, elevators, vehicles, furniture, doors. CRT displays, personal computer/organizer screens, touch screens, and membrane switches.

In a preferred embodiment of the construction
the structure comprises a vehicle comprising a window;
and the article is bonded via the bonding layer of the bottom sheet to the window. Most preferably the vehicle is selected from the group consisting of buses, trains, and subways.

The present invention also provides a method comprising the steps of:
(a) applying an article as described above to a substrate via the bonding layer of the bottom sheet of the article;
(b) allowing the topmost sheet of the article to be damaged;
(c) removing the damaged topmost sheet of the article by identifying the topmost sheet in the stack with reference to the indexing surface and gripping the topmost sheet and pulling it away from the stack, in a manner such that neither the sheet being removed nor the stack of sheets which remains delaminates, in order to expose a lower sheet of the article which becomes the topmost sheet of the article.

In a preferred embodiment of the method, steps (b) and (c) are repeated at least once. More preferably steps (b) and (c) are repeated until the bottom sheet is removed, and the bottom sheet upon removal leaves substantially no adhesive residue (most preferably) on the substrate.

BRIEF DESCRIPTION OF THE DRAWINGS

The accompanying drawings are included to provide a further understanding of the present invention and are incorporated in and constitute a part of the specification. The drawings illustrate the embodiments of the present invention and together with the description serve to explain the principals of the invention. Other embodiments of the present invention and many of the advantages of the present invention will readily appreciated as the same become better understood by reference to the following description when considered in connection with the accompanying drawings, in which like reference numerals designate like parts throughout the figures.

FIG. 1a is a cross-sectional view taken along line 1a—1a of the construction of FIG. 5a.

FIG. 4 is identical to FIG. 3 except that damaged topmost sheet has been removed.

DETAILED DESCRIPTION

Article

Figure 1:
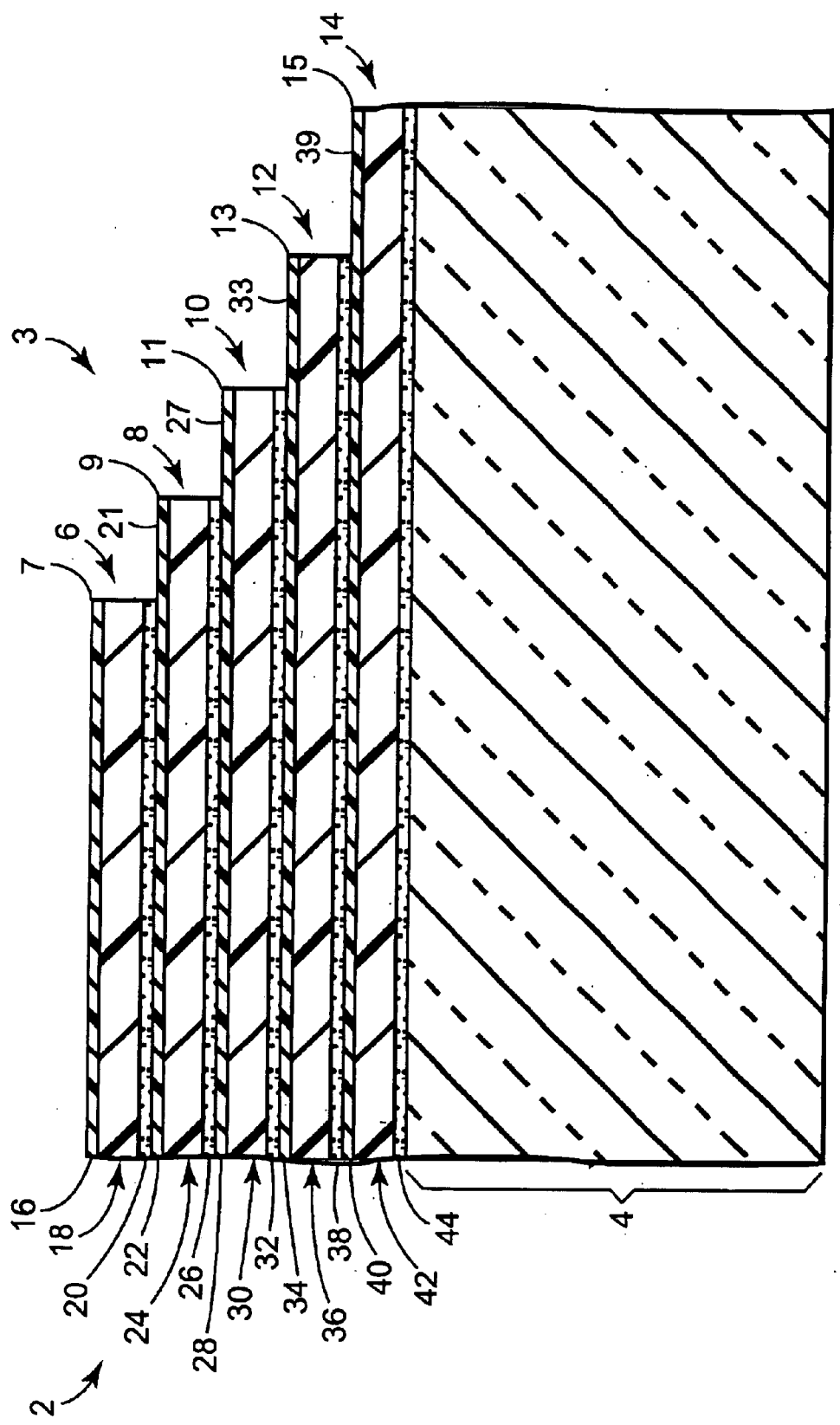
FIG. 1 is a cross-sectional view taken along line 1—1 of the construction of FIG. 5.

With respect to the article of the invention, preferably the stack of sheets has no effect on visual acuity. The test for the effect on visual acuity appears later herein. This test can be used to determine the effect of an observer to discern images when looking through the article of the invention.

Preferably the article (as well as the stack of sheets and each individual sheet) has a haze value of less than about 10 percent, more preferably less than about 5 percent, and most preferably less than about 3 percent.

The article of the invention as well as the sheets making up the article are typically colorless although they may optionally be tinted. The sheets may optionally have a graphic thereon which would typically be on the edge of each sheet.

Sheets

Preferably the article comprises at least about 2 sheets, typically about 3 to about 10 sheets. Preferably each sheet has the substantially the same length, width, and shape. In a preferred embodiment each sheet is rectangular in shape.

Each sheet preferably provides a protective barrier to preferably prevent damage to a substrate to be protected such as a glass window as well as any sheets below the exposed topmost sheet. The sheet preferably resists penetration and damage from conventional scratching tools such as razor blades, knives, lava rocks, abrasive cloths, diamonds and carbide tipped styli. Preferably at least one (more preferably each) sheet has a penetration resistance of at least about 0.5 kg, more preferably at least about 2 kg, and most preferably at least about 4 kg.

Effect on visual acuity and color preferably remain stable upon exposure to a variety of environmental conditions.

The sheet is preferably easily removable, preferably in a continuous piece. The following tests which evaluate the integrity and removability of a sheet can be used to help predict the removability of a sheet.

Preferably at least one sheet (more preferably each sheet as well as each film making up the sheet) has a tensile strength when subjected to ASTM D882 of about 20 to about 2000 kP, more preferably about 70 to about 1400 kP, and most preferably about 350 to about 1000 kP. Preferably at least one sheet (more preferably each sheet as well as each film making up each) has an elongation when subjected to ASTM D882 of about 5 to about 1000%, preferably about 5 to about 500 percent, and most preferably about 20 to about 100 percent.

Preferably at least one sheet (preferably each sheet as well as each film making up each sheet) has a tear strength when subjected to ASTM D1004 of about 0.05 to about 5 kg, more preferably about 0.5 to about 2.5 kg, and most preferably about 1.5 to about 2.5 kg.

Film

Preferably the film comprises a material selected from the group consisting of polyester, polycarbonate, acrylic, polyurethanes, poly acetyl, polyolefin based ionomers, ethylene vinyl acetate polymers, polyethylene, polypropylene, polyvinyl chloride, polystyrene, urethane acrylate polymers, epoxy polymers, epoxy acrylate polymers, and blends thereof. In one embodiment the film comprises multiple layers.

The thickness of the film depends on the type of damage that the film may be subjected to and the composition of the film. Typically the film has a thickness of about 25 to about 4000 microns for reasons of weight, visual acuity and economics, preferably about 50 to about 1000 microns and most preferably about 50 to about 250 microns.

The film can optionally further comprise stabilizers and fillers which enhance the durability of the film upon exposure to ultraviolet light and/or heat Additives can also be incorporated into the film that reduce the flammability of the film or smoke generation during combustion.

Bonding Layer

The bonding layer preferably provides a stable bond between the film layers. It is intended to prevent premature separation of the sheets under the environmental conditions anticipated in the application. It preferably serves to act as an optically clear interface between the films. However, it must bond more readily to the film of the same sheet than to the film of the sheet below.

In a preferred embodiment the first side of the film is not bonded to a bonding layer. The bonding layer as well as the other layers making up a sheet preferably do not change color when subjected to environmental conditions. Furthermore, the stability of the bonding layer preferably should not change dramatically on exposure to a wide range of conditions.

The bonding layer may comprise a pressure sensitive adhesive system or a non-pressure sensitive adhesive system. Preferably the bonding layer comprises a pressure sensitive adhesive. The bonding layer preferably comprises a material selected from the group consisting of acrylics, for example, which are thermally cured, ultraviolet light cured, electron beam cured and can be solvent based, waterbased or 100 percent solids; rubbers, for example, which can be thermoplastic rubbers, block copolymers, natural rubbers or silicone rubbers; and polyolefins which can, for example, be ethylene vinyl acetate polymers, poly-alpha olefins ($C_3$–$C_{10}$) copolymers or blends of poly-alpha olefins with ethylene or propylene based polymers; and mixtures thereof.

The bonding layer may optionally further comprise a component selected from the group consisting of tackifiers, oils, stabilizers, flame retardants, fillers, and mixtures thereof subject to obtain the desired properties. Preferably the bonding layer further comprises a component selected from the group consisting of ultraviolet light absorbers, ultraviolet light stabilizers and mixtures thereof. Preferably the component selected from the group consisting of ultraviolet light absorbers, ultraviolet light stabilizers and mixtures thereof is used in an amount to inhibit degradation of the article from ultraviolet radiation, preferably about 0.5 to about 1 percent by weight based on the total weight of the bonding layer.

Preferably at least about 80 percent, more preferably at least about 90 percent, and most preferably about 100 percent of the surface area of the second side of the film has the bonding layer bonded thereto. Preferably the bonding layer is continuous. Preferably any areas of the film not covered by the bonding layer are margin(s).

Preferably the bonding layer has a thickness ranging from about 5 to about 150 microns, more preferably about 10 to about 50 microns, and most preferably about 10 to about 25 microns.

Optional Release Layer

The optional release layer preferably prevents light scratching of the surface of the film and in addition can provide a release surface for the bonding layer on the sheet above. This optional release layer is preferably bonded to the film layer in a manner so as to maintain the bond after a variety of environmental exposures. In addition, the release layer preferably remains clear after environmental exposures. It preferably maintains scratch resistant over time. It preferably forms a stable adhesion to the bonding layer and provides a consistent surface for removal of the sheet above.

Preferably the release layer, if present has a thickness ranging from about 0.1 to about 25 microns, more preferably about 2.5 to about 5 microns.

Preferably the release layer comprises a material selected from the group consisting of acrylates, methacrylates, urethanes, polyolefins, silicones, fluorochemicals such as fluorocarbons, and mixtures thereof.

U.S. Pat. No. 5,633,049 describes a method of making a protective coating for thermoplastic transparencies particularly aircraft transparencies. The coating is prepared from a silica-free protective coating precursor composition comprising a multifunctional ethylenically unsaturated ester of acrylic acid, a multifunctional ethylenically unsaturated ester of methacrylic acid, or a combination thereof, and an acrylamide. Such a protective coating may be useful as a release coating for the article of the present invention.

The release layer may optionally further comprise a filler such as ceramer particles, for example, as described in U.S. Pat. No. 5,104,929, in order to provide enhanced abrasion resistance properties.

The adhesion of the bonding layer to the release layer can be adjusted, for example, by incorporation of flow additives such as silicones, acrylics or fluorochemicals to the release layer.

The release layer can optionally be selected to improve the Taber Abrasion Resistance of the sheet. Release materials which may provide good Taber Abrasion Resistance properties include but are not limited to multifunctional acrylates or methacrylates.

The release layer on the top surface of the film layer may provide uniform release performance across the sheet. Optionally, a differential release layer can be coated on the film surface. Such a differential release layer can be used to make the initial separation of a sheet from the stack of sheets easier. Differential release can be obtained, for example, by coating a material providing easy release at the edge and/or corner of the sheet and coating a material providing tighter release on the balance of the sheet surface.

Suitable multifunctional ethylenically unsaturated esters of (meth)acrylic acid are the polyacrylic acid or polymethacrylic acid esters of polyhydric alcohols including, for example, the diacrylic acid and dimethylacrylic acid ester of aliphatic diols such as ethyleneglycol, triethyleneglycol, 2,2-dimethyl-3,3-propanediol, 1,3-cyclopentanediol, 1-ethoxy-2,3-propanediol, 2-methyl-2,4-pentanediol, 1,4-cyclohexanediol, 1,6-hexamethylenediol, 1,2-cyclohexanediol, 1,6-cyclohexanedimethanol; the triacrylic acid and trimethacrylic acid esters of aliphatic triols such as glycerin, 1,2,3-propanetrimethanol, 1,2,4-butanetriol, 1,2,5-pentanetriol, 1,3,6-hexanetriol, and 1,5,10-decanetriol; the triacrylic acid and trimethacrylic acid esters of tris (hydroxyethyl) isocyanurate; the tetraacrylic and tetramethacrylic acid esters of aliphatic triols, such as 2,3,4-butanetetrol, 1,1,2,2,-tetramethylolethane, 1,1,3,3-tetramethylolpropane, and pentaerythritol tetraacrylate; the pentaacrylic acid and pentamethacrylic acid esters of aliphatic pentols such as adonitol; the hexaacrylic acid and hexamethacrylic acid esters of hexols.

Preferably the release layer is present and the release layer of at least one sheet (preferably each sheet) has a Taber abrasion resistance of about 25 or less (more preferably about 10 or less and most preferably about 2 or less) as measured according to ASTM D1044-76 after 100 cycles. The release layer is not required if the bonding layer is anchored well to the film. For example, the film surface coated with the bonding layer may be chemically primed or oxidized with a corona discharge treatment or flame treatment. The film surface not coated with the bonding layer would be free of surface treatments. This adhesion differential between the two sides of the film facilitates clean separation of sheets from the stack. The film may also be soluble in the solvents or monomers used for the bonding layer. By coating a bonding layer on a soluble film and curing or evaporating, the bonding layer can become entangled with the film. The adhesion of the bonding layer to the coated film surface is greater than adhesion to the laminated surface in the stack of sheets due to the differential in adhesion, clean separation of a sheet from a stack can be obtained.

Optional Prime Layer

An optional prime layer can be used to provide an adhesion promoting interface between the bonding layer and the film of the same sheet. Alternatively the film surface can optionally be modified via corona discharge treatments in a variety of atmospheres or by using a flame in order to promote adhesion between the bonding layer and the film of the same sheet. A prime layer can be, for example, an aziridine based prime layer or a grafted surface such as an acrylamide/multifunctional acrylate polymerized into the film surface with high-energy radiation. Other examples of prime layers include, for example, acrylics, polyvinylidene chloride and solution coated polyesters.

A prime layer can be, for example, a high tack pressure sensitive adhesive with a composition similar to the bonding layer. It can also, for example, be a coextruded interface prepared as a component of the film or resin solution coated on the film.

Preparation of the Article of the Invention

The article of the invention can be made in a number of different ways. One method of making the article of the invention is to apply the optional release coating on the surface of a film. The release coating could be applied by roll coating, gravure coating, or by an air knife coating process, for example. Any solvent(s) present in the coating are evaporated in an oven. The release coating can then be cured with ultraviolet (UV) light or with an electron beam. Alternatively, the opposite surface of the film may optionally be primed either with a surface treatment such as corona treatment or a flame treatment. The prime could also be a chemical prime. The chemical prime could be pre-applied by the film supplier or applied, for example, by roll coating, gravure coating, or by an air knife coating process. The solvent(s) are evaporated from the priming layer. The prime layer may be coated with the bonding layer by a variety of methods including notch bar coating, curtain coating, or slot die coating of a solution or latex. Another method of applying the bonding layer is extrusion coating of a 100% solids bonding layer. Depending on the chemistry of the coating, the bonding layer material is dried and/or cured to form a finished polymer. When the bonding layer is tacky at room temperature the bonding layer is preferably protected by a smooth release film. A stack of sheets can be prepared by removing the release liner from the bonding layer and laminating the bonding layer to the release surface of an adjacent sheet. The end application dictates the number of sheets in the stack. The stack of sheets can be cut into a desired shape by die cutting with a steel rule die, laser or with a waterjet.

Another approach to forming a stack of sheets is to prepare a film with a primed surface and an opposite release surface. An ultraviolet curable liquid bonding layer is applied to the primed surface of one film and laminated in the liquid state to the release surface of a subsequent film. The liquid is cured. An ultraviolet curable liquid bonding layer is applied to the primed surface of a third film and laminated to the exposed release surface of the first laminated sheets. The liquid is cured resulting in a stack of three sheets. This lamination and curing process can be repeated until the desired number of sheets in a stack is obtained.

Other approaches to making the article of the invention are also possible.

Application of Article to Substrate

The article of the invention can be applied to a substrate in a number of different ways. For example, it can be applied by spraying an alcohol/water solution such as a 25% isopropanol/75% water solution on to the surface of the substrate. The release liner is removed from the bottom sheet of the stack of sheets to expose a bonding layer and the exposed bonding layer is also sprayed with the same isopropanol/water solution. The substrate and the saturated bonding layer are brought into contact and the excess solution is removed from the interface with a roller or a squeegee. The stack of sheets could also be applied to a substrate with a dilute solution of dishwashing detergent in water such as for example a 0.5% Joy™ dishwashing detergent 99.5% water solution. The stack of sheets could also be applied directly to the substrate with high pressure lamination without a liquid interface. The stack of sheets could be applied to the substrate by applying an ultraviolet light curable coating on the substrate as the liquid interface. The stack of sheets is applied, the excess air is removed by a roller or squeegee and the coating is cured.

Vertically Staggered Side Edge

In the article of the invention at least a portion of the length of a side edge of the article has a vertically staggered side edge. As used herein "vertically staggered side edge" means that the side edges of adjacent individual sheets making up the stack of sheets (i.e., the article) are staggered (i.e., non-aligned) with respect to one another. The vertically staggered arrangement of the side edge of one sheet with respect to an adjacent sheet in the stack makes possible the easy identification of a single sheet (i.e., identification of a single sheet) for removal thereof from the stack of sheets.

In one preferred embodiment, the side edge of the article is in a "staircase" type arrangement wherein, with respect to each sheet in the stack, the next lower sheet in the stack extends beyond the side edge of the sheet above. In another preferred embodiment, the side edges of the sheets are staggered in a "reverse staircase" arrangement wherein, the respect to each sheet in the stack, the side edge of the next lower sheet in the stack is positioned inside of the side edge of the sheet above. In another preferred embodiment, the side edges of the sheets are staggered in an alternating arrangement wherein with respect to each sheet in the stack, the side edge of the next lower sheet is positioned inside or outside of the staggered side edge of the sheet above and, with respect to every second sheet in the stack, the side edges are in substantially vertical alignment with one another. Such an arrangement may be described as having a "sawtooth" side edge. Other arrangements are also within the scope of the invention. For example, a staggered side edge may have both a staircase and reverse staircase arrangement.

The staggered side edge of the article of the present invention may be positioned entirely along one side edge of the article or the staggered side edge may be positioned at a corner of the article. In a preferred embodiment, the staggered side edge is positioned at a corner of the article.

The article of the invention can be better understood by referring to the following FIGS. 1 to 9b.

Figure 5:
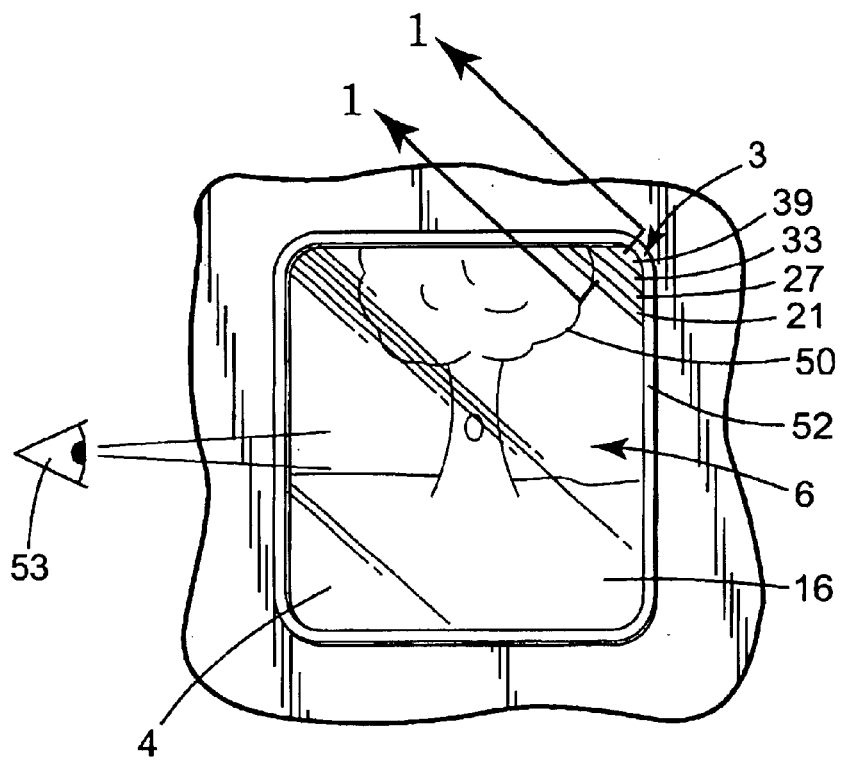
FIG. 5 is a plan view of a construction comprising an article of the invention adhered to a window.

FIG. 1 is a cross-sectional view taken along line 1—1 of the construction of FIG. 5. The article 2 of the invention is bonded via bonding layer 44 to a glass window pane 4. The article 2 comprises a stack of five sheets (6, 8, 10, 12, and 14) bonded together. Sheet 6, which is the topmost sheet in FIG. 1, comprises top release layer 16, inner film layer 18, and lower bonding layer 20. Sheet 8 comprises top release layer 22, inner film layer 24, and lower bonding layer 26. Sheet 10 comprises top release layer 28, inner film layer 30, and lower bonding layer 32. Sheet 12 comprises top release layer 34, inner film layer 36, and lower bonding layer 38. Sheet 14, which is the bottom sheet of article 2, comprises top release layer 40, inner film layer 42, and lower bonding layer 44.

Figure 7:
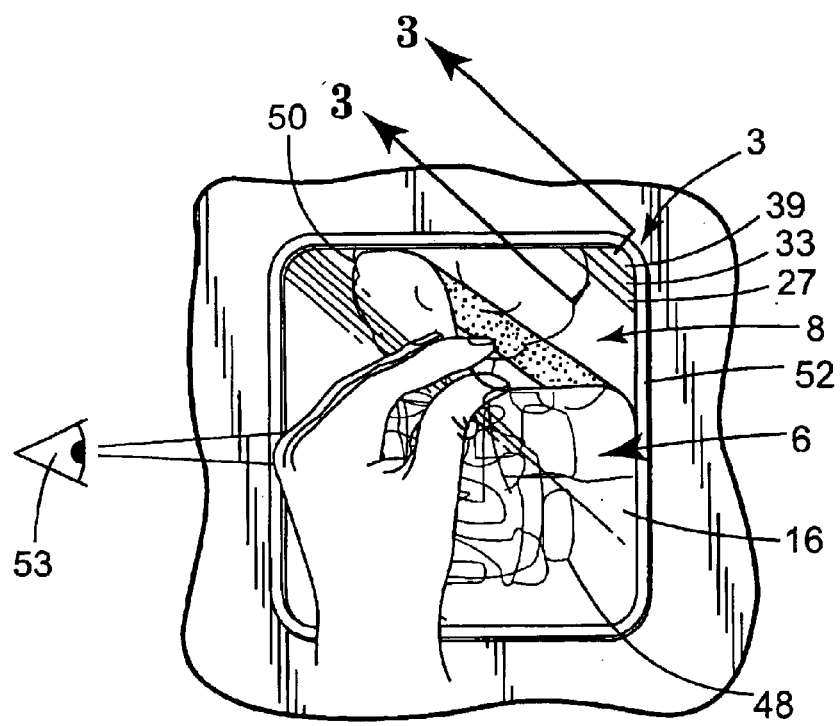
FIG. 7 illustrates a plan view of the construction of FIG. 6 wherein the damaged topmost sheet is being peeled away to reveal an undamaged sheet.

FIG. 1 shows a preferred embodiment of the article of the present invention 2 having staggered edge 3. In this embodiment of an article of the present invention, staggered edge 3 may be described as being in a "staircase" configuration. As shown in FIG. 1, along staggered edge 3 of article 2, sheet 8 extends beyond side edge 7 of sheet 6 providing indexing surface 21. Similarly, sheet 10 extends beyond side edge 9 of sheet 8 providing indexing surface 27. Sheet 12 extends beyond side edge 11 of sheet 10 providing indexing surface 33. Sheet 14 extends beyond side edge 13 of sheet 12 providing indexing surface 39. Staggered side edge 3 including indexing surfaces 21, 27, 33, and 39 provides a precise way to identify the individual sheets of the stack of sheets, thereby allowing a person to remove only a single sheet (for example, sheet 6) from the stack. As shown in FIG. 7, the staggered side edge 3 is positioned in a corner of article 2. Often time, it will be desirable to position the corner having the staggered side edge away from easy reach of vandals, for example, in the upper corner of a window, in order to prevent the removal of the sheets. The remaining side edges of article 2 comprise individual sheets having side edges that are in vertical alignment with one another. In the embodiment of FIG. 1, indexing surfaces 21, 27, 33, and 39 have a trapezoidal shape although other shapes for the indexing surface are also possible.

Figure 2:
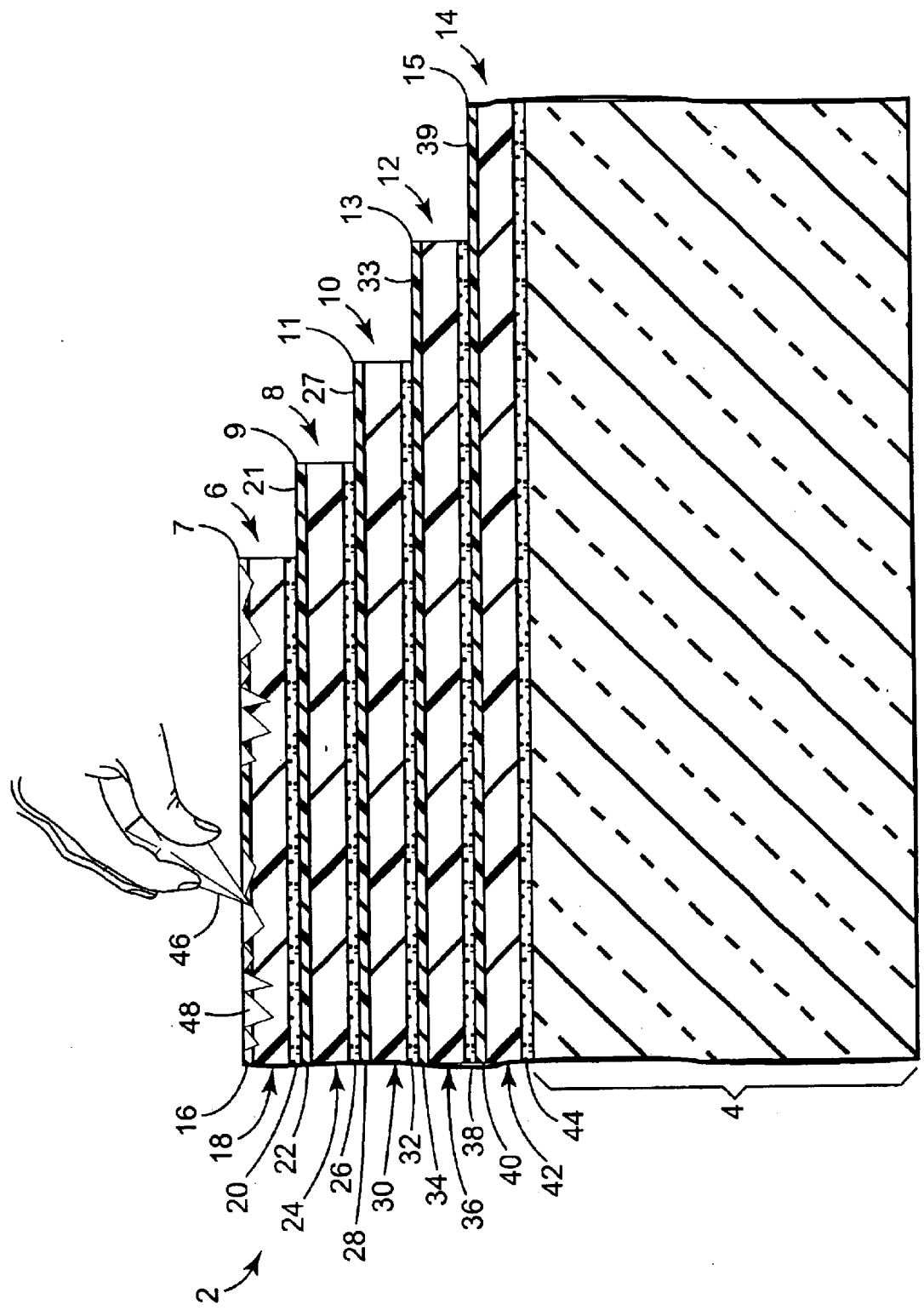
FIG. 2 is a cross-sectional view taken along line 2—2 of the construction of FIG. 6.
Figure 6:
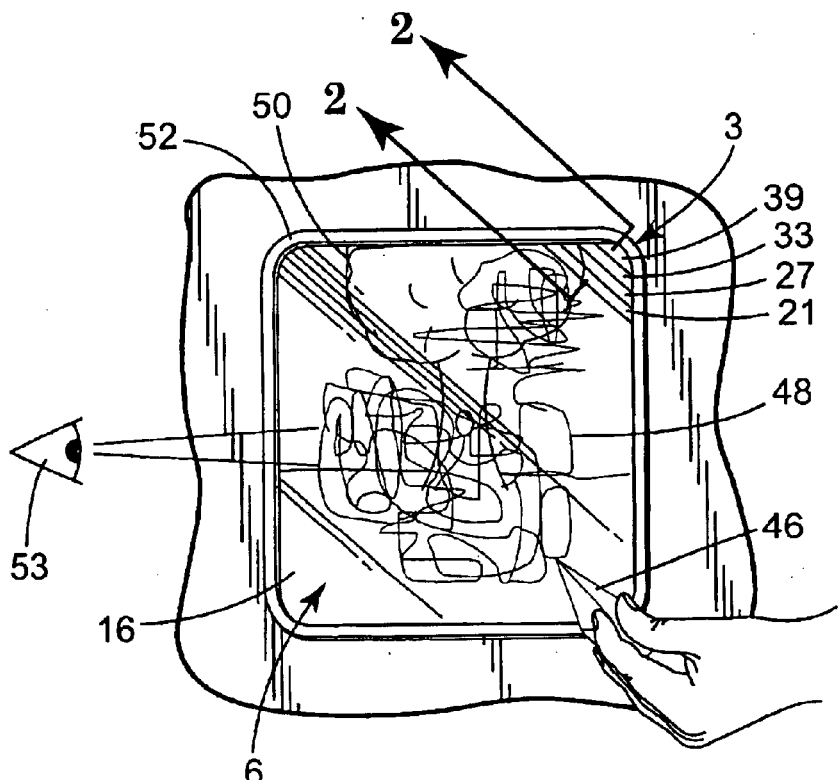
FIG. 6 illustrates a plan view of the construction of FIG. 5 wherein the topmost sheet of the article is being damaged by a rock.

FIG. 2 is a cross-sectional view of the construction of FIG. 6. FIG. 2 shows the topmost sheet 6 being scratched 48 by rock 46.

Figure 3:
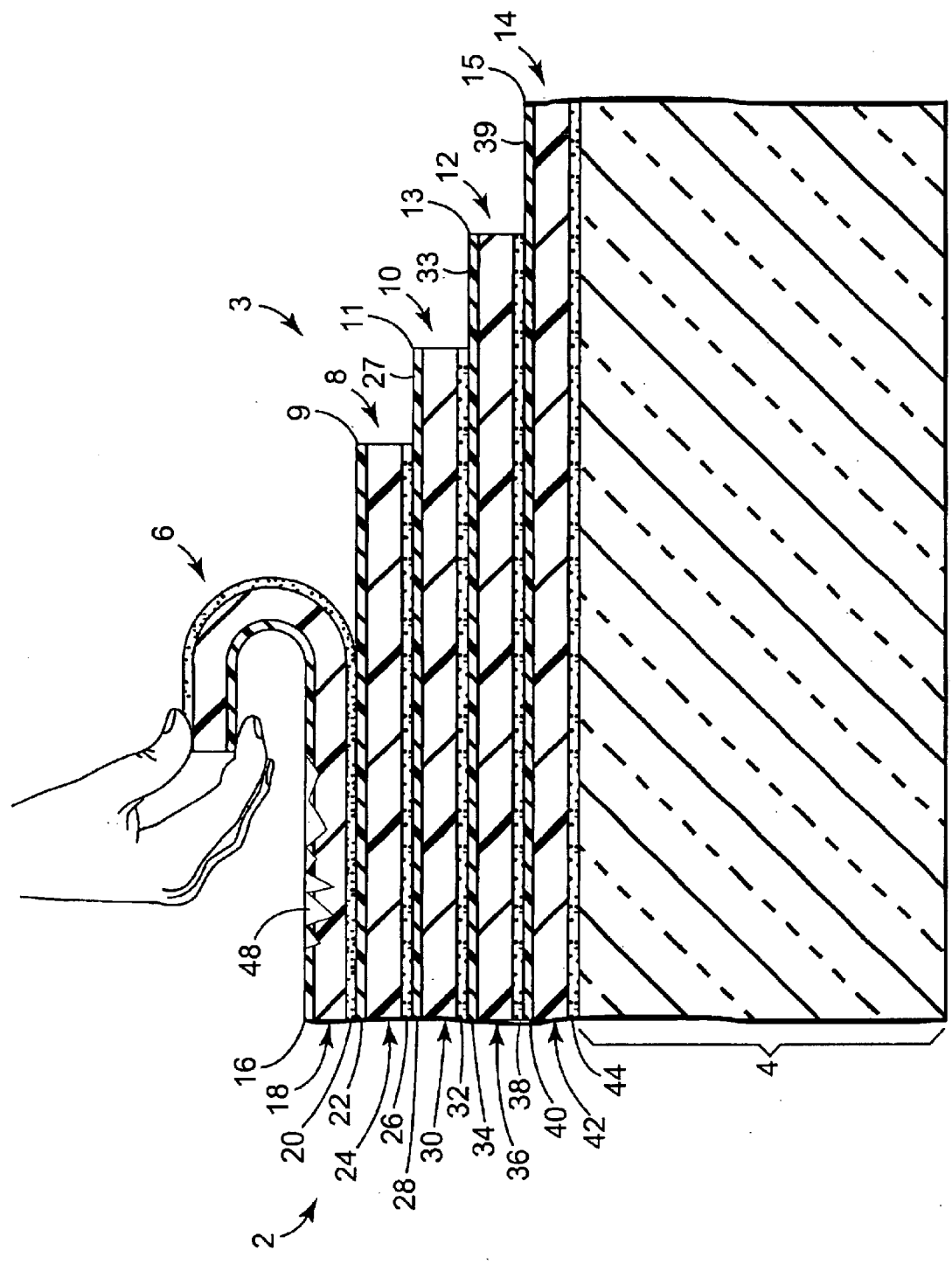
FIG. 3 is a cross-sectional view taken along line 3—3 of the construction of FIG. 7 showing a person peeling away a damaged topmost sheet to reveal a new topmost sheet.

FIG. 3 is a cross-sectional view of the construction of FIG. 7 along line 3—3 showing a person peeling away the damaged topmost sheet 6 to reveal a new topmost sheet 8. Since article 2 has staggered edge 3, top sheet 6 can be accurately identified with reference to indexing surface 21 and may be quickly separated removed from the remaining sheets comprising the stack.

Figure 4:
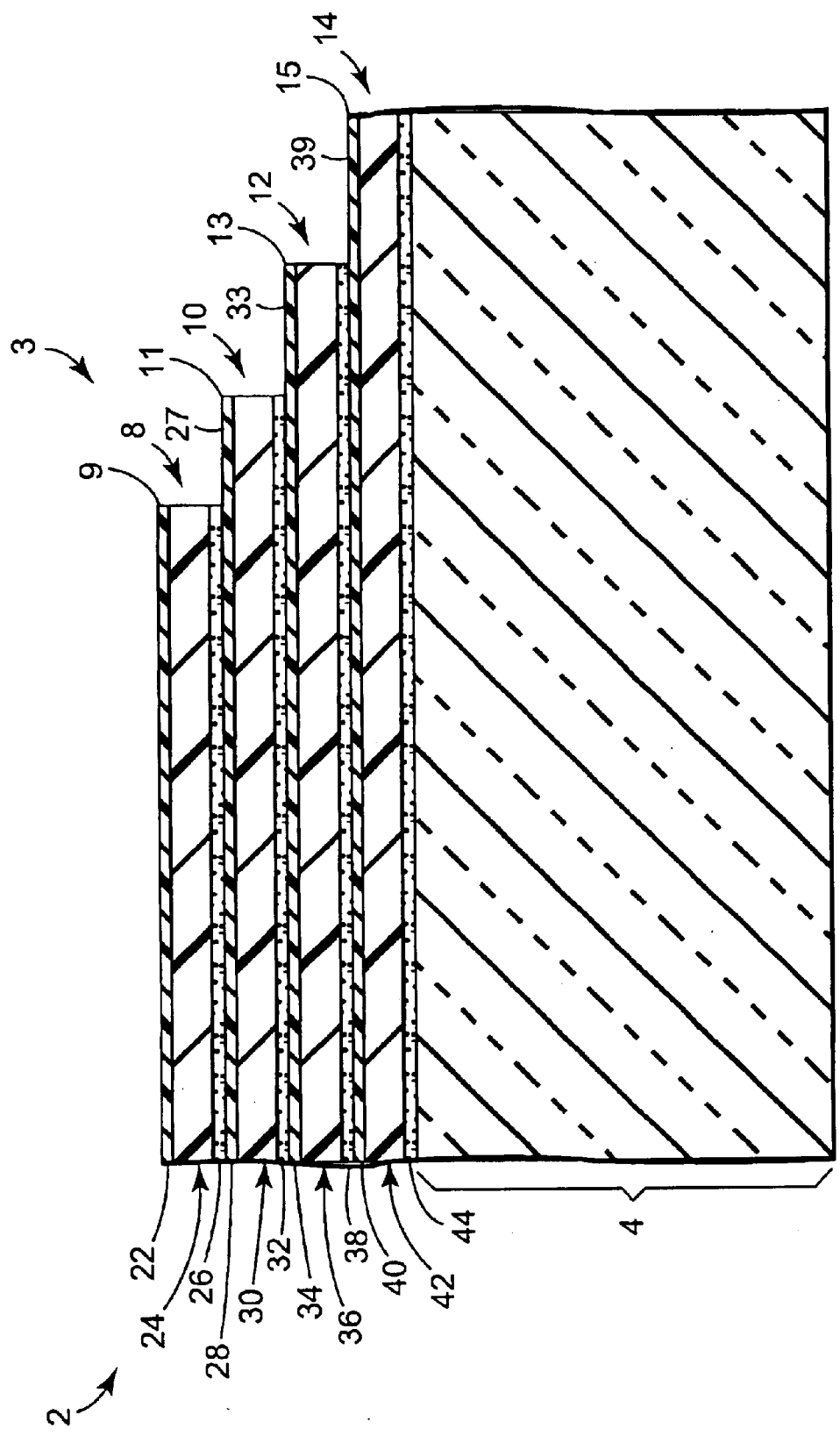
FIG. 4 is a cross-sectional view of the construction of FIG. 8 taken along line 4—4 showing a stack of four sheets which is undamaged.
Figure 8:
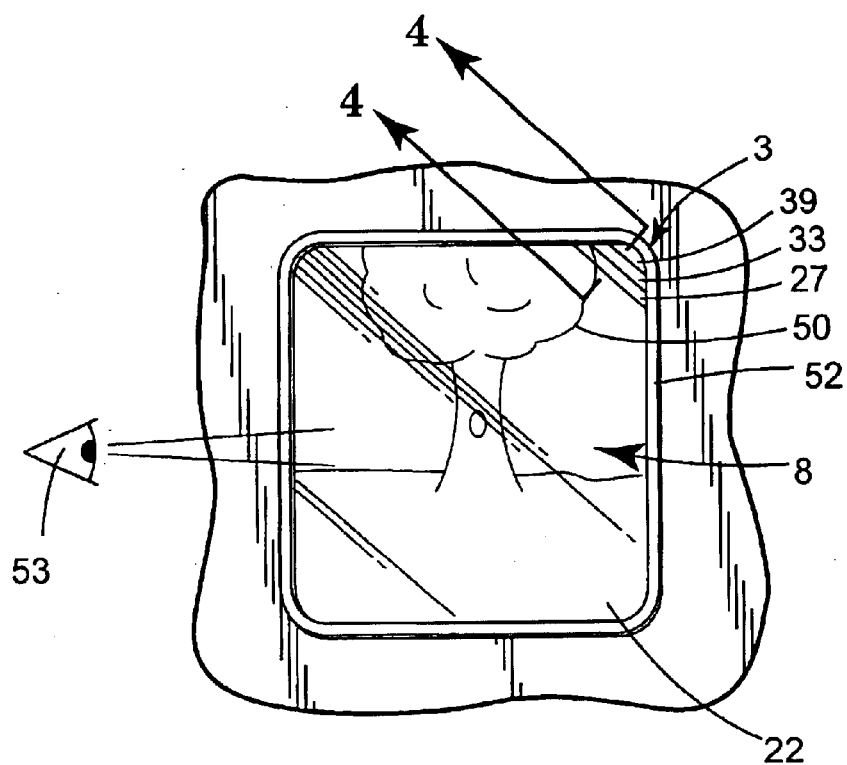
FIG. 8 illustrates a plan view of the construction of FIG. 7 after the damaged sheet has been removed and an undamaged sheet has been revealed.

FIG. 4 is a cross-sectional view of the construction of FIG. 8 along line 4—4 showing a now four sheet stack of sheets which is undamaged, wherein the topmost sheet is now sheet 8. FIG. 8 is identical to FIG. 7 except that damaged topmost sheet 6 has been removed.

FIG. 5 is a plan view of a construction comprising article 2 of the invention on a window. Staggered side edge 3 having indexing surfaces 21, 27,33, and 39 is shown in the upper right hand corner of the window 4. An observer 53 can view a tree 50 through the undamaged window 4 and article 2. A rim 52 extends around the window 4.

FIG. 6 illustrates a plan view of the construction of FIG. 5 wherein the top sheet 6 of the article 2 is being damaged by a rock 46.

FIG. 7 illustrates a plan view of the construction of FIG. 6 wherein the damaged sheet 6 is being peeled away to reveal an undamaged sheet 8.

FIG. 8 illustrates how the observer 53 can now clearly view the tree 50 after the damaged sheet 6 of FIG. 7 has been removed and undamaged sheet 8 has been revealed.

Figure 1A:
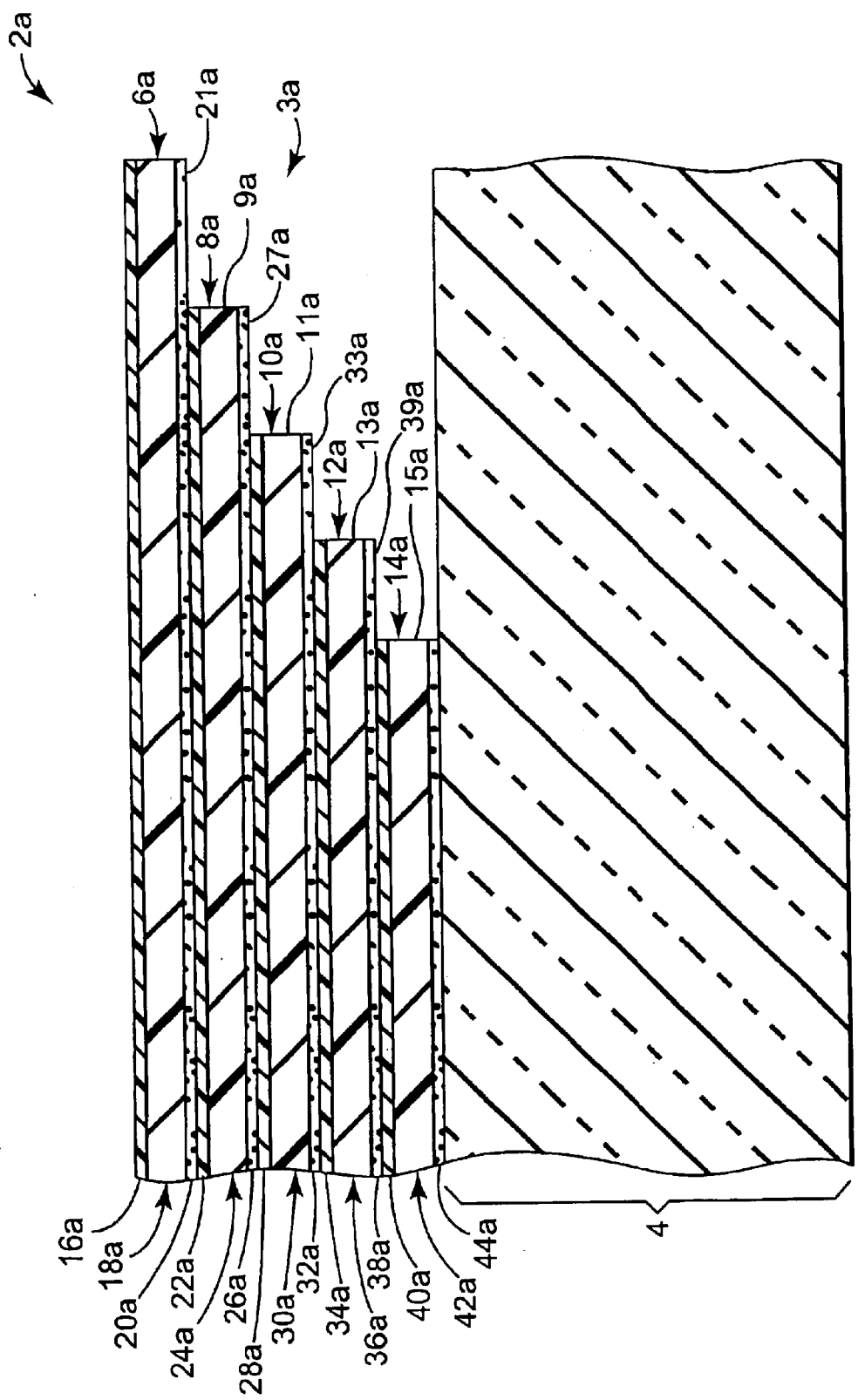
Figure 1B:
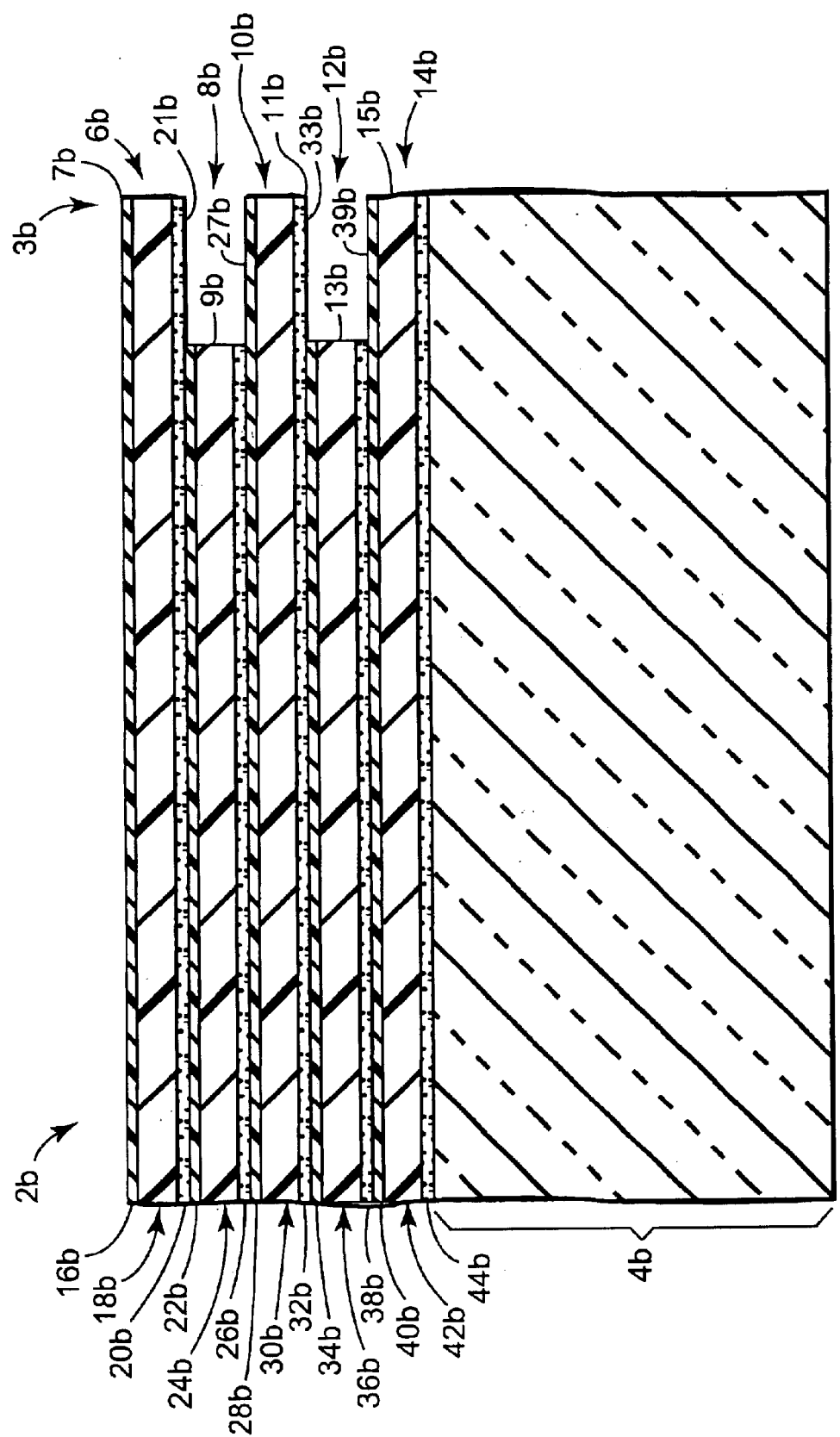
FIG. 1b is a cross-sectional view taken along line 1b—1b of the construction of FIG. 5b.
Figure 5A:
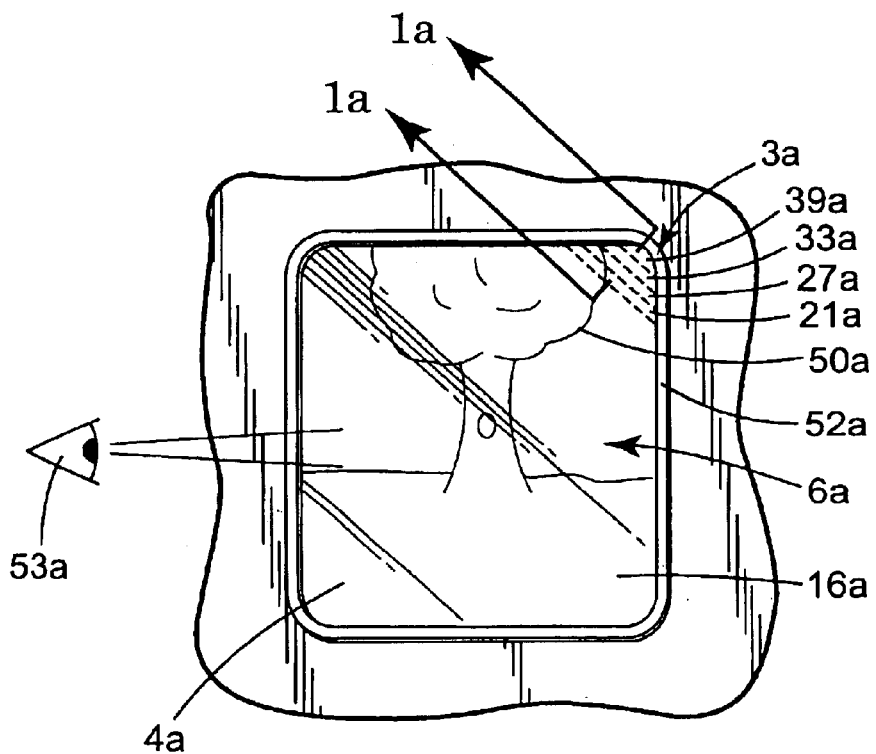
FIG. 5a is a plan view of a construction comprising an article of the invention adhered to a window.
Figure 5B:
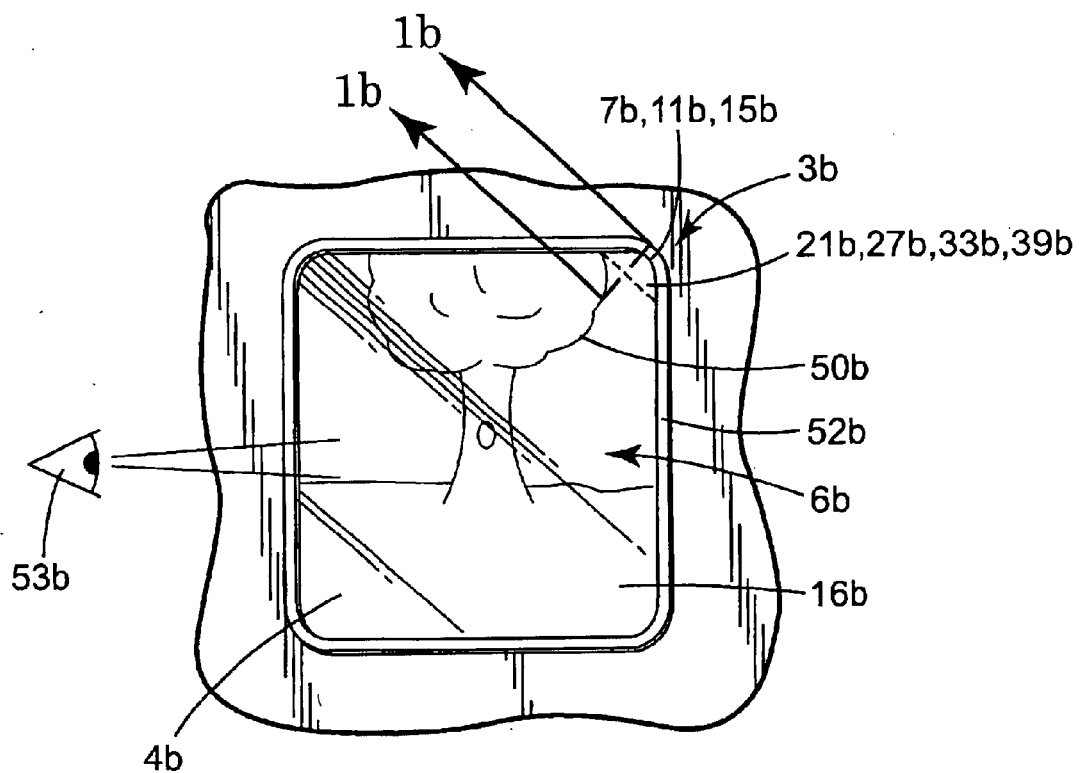
FIG. 5b is a plan view of a construction comprising an article of the invention adhered to a window.

FIGS. 1a and 5a present another embodiment of an article of the present invention having a staggered side edge 3a in a "reverse staircase" configuration. In the reverse staircase configuration of FIG. 1a, sheet 6a extends beyond side edge 9a of sheet 8a providing indexing surface 21a. Sheet 8a extends beyond side edge 11a of sheet 10a providing indexing surface 27a. Sheet 10a extends beyond side edge 13a of sheet 12a providing indexing surface 33a. Sheet 12a extends beyond side edge 15a of sheet 14a providing indexing surface 39a. Staggered side edge 3a of article 2a provides a precise way to identify the individual sheets comprising the stack of sheets thereby allowing a person to remove only a single sheet (for example, sheet 6a) from the stack. A plan view of the FIG. 1b and 5b present another embodiment of an article of the present invention having an staggered side edge 3b in an "alternating" configuration. Such an alternating configuration includes sheets having a staircase configuration and sheets having a reverse staircase arrangement relative to one another. For example, sheets 8b and 10b are in a staircase configuration and sheets 6b and 8b are in a reverse staircase arrangement.

In the article of the present invention the indexing surfaces may have any desired size and shape and may be located along one or more side edges of the article or may be positioned at a corner of the article. Typically and preferably the indexing surfaces are small in size in order to prevent vandals from visually detecting the presence of the stack of sheets and in order to prevent unwanted tampering with the article if detected. For article of the present invention having very small and tamper resistant indexing surfaces, it may be desirable to use a sharp instrument, for example, a dental pick or canine tooth scraper, at the indexing surface to assist in peeling back the topmost sheet of the stack of sheets. Preferably, the indexing surfaces have a width ranging from about 0.5 to about 25 mm, more preferably ranging from about 0.5 mm to about 1.5 mm and have a length ranging from about 1 cm to about 50 cm, more preferably ranging from about 1 cm to about 10 cm.

Figure 9:
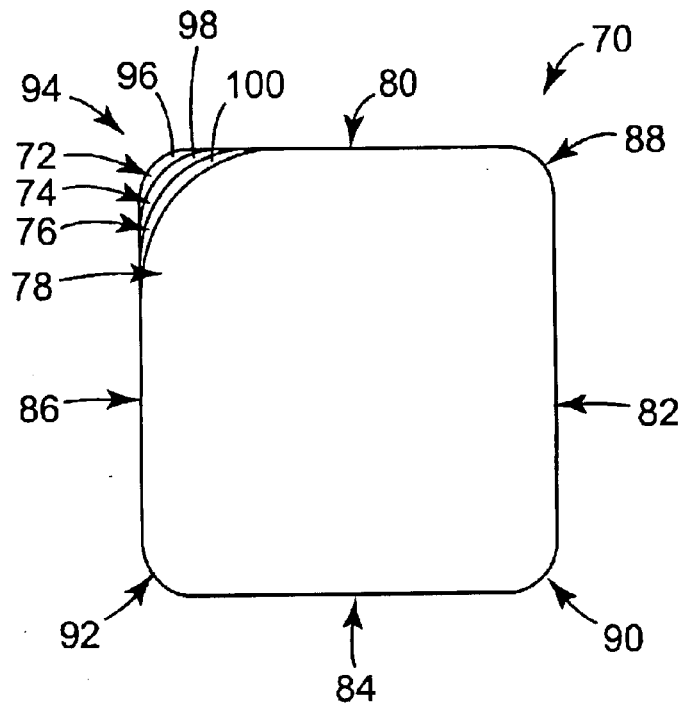
FIG. 9 illustrates a plan view of an article of the present invention having a staggered edge located at a corner of the article.

The shape of the indexing surface may also be selected to provide increased tamper resistance and other desirable features. For example, FIG. 9 shows a plan view of a preferred embodiment of the present invention having a staggered side edge in a staircase configuration and having preferred crescent shaped indexing surfaces. Referring to FIG. 9, article of the present invention 70 includes sheets 72, 74, 76 and 78. Each sheet comprises a film layer, a bonding layer, and optionally a release layer (the layers comprising the sheets are not shown individually in FIG. 10). Article 70 is rectangular in shape having linear side edges portions 80, 82, 84, and 86 and radiused corners 88, 90, 92, and 94. In this embodiment, linear side edges 80, 82, 84, and 86 comprise the side edges of individual sheets 72, 74, 76, and 78 which are in vertical alignment with one another. Radiused corner 94 has a vertically staggered side edge defining indexing surfaces 96, 98, and 100 which may be described as being crescent shaped. Crescent shaped indexing surfaces 96, 98, and 100 are formed by varying the radius of curvature of the sheets 72, 74, 76, and 78 at radiused corner 94. As shown in FIG. 9, the crescent shaped indexing surfaces have a maximum width at the center and narrow at each end where the side edges of the sheets come into vertical alignment at sides 80 and 86.

Figure 9A:
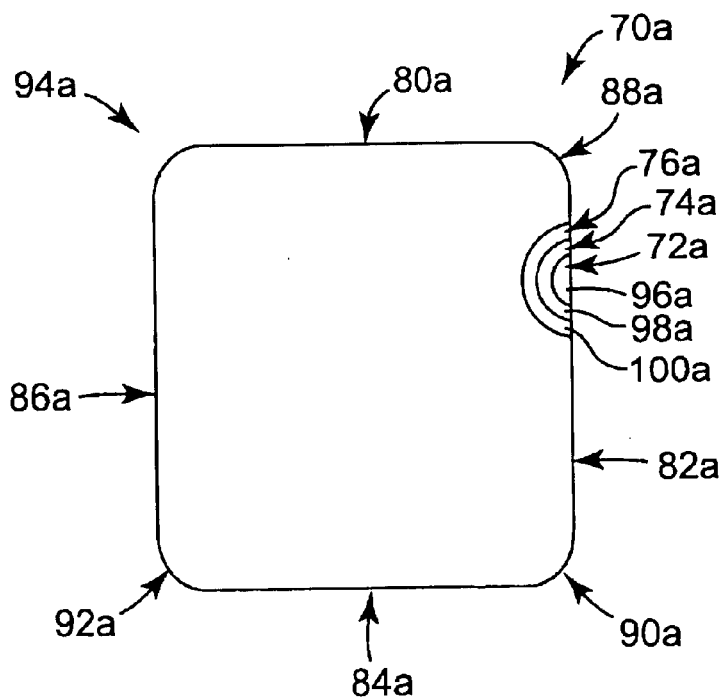
FIG. 9a illustrates a plan view of an article of the present invention having a staggered edge located at an edge of the article.
Figure 9B:
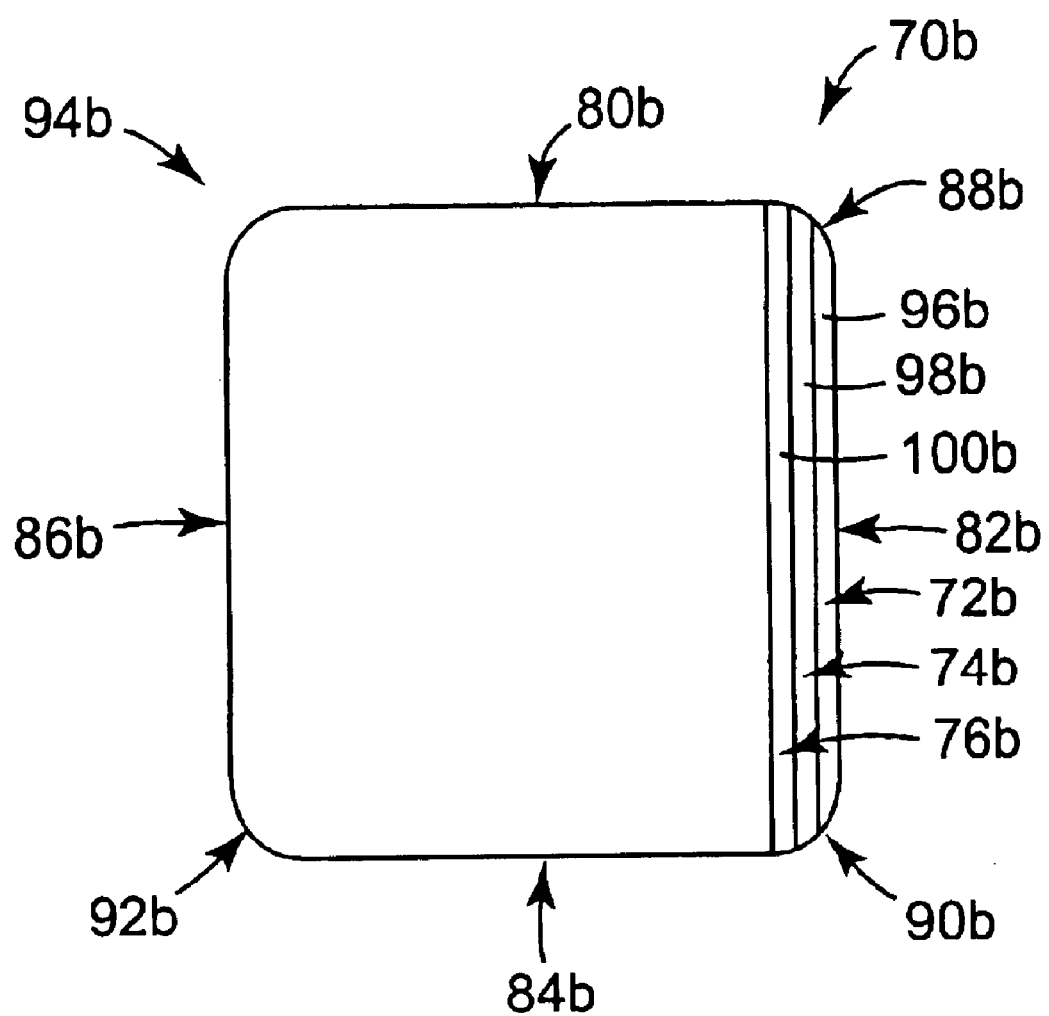
FIG. 9b illustrates a plan view of an article of the present invention having a staggered edge located at an edge of article.

Various other embodiments of a staggered side edge may be envisioned and the present invention is not intended to be limited by the location, indexing surface shape and size, configuration, or number of individual staggered edges on an article of the present invention. Representative examples are shown in FIGS. 9a–9b. For example, FIG. 9a presents a plan view of an article of the present invention having a staggered side edge in a staircase configuration located along a portion of one edge of the article. FIG. 9b presents a plan view of an article of the present invention having a staggered side edge in a staircase configuration along an entire edge of the article.

Crescent shaped indexing surfaces such as those shown in FIG. 9 may be preferred for several reasons. First, crescent shaped indexing surfaces tend to be particularly resistant to tampering by vandals. Since the staggered edge comprises a series of smooth curves of increasing radii of curvature that substantially converge at the vertically aligned side edges, the staggered side edge has no angled corners. Angled corners are particularly susceptible points of attack for vandals desiring to remove one or more layers from the stack of sheets. Further, when manufacturing articles of the present invention, it is typically necessary to remove the trim pieces that are generated when a staggered edge is cut into a stack of sheets. Since the trim pieces generated for crescent-shaped indexing surfaces substantially converge to a point at both ends, a manufacturing worker may easily grasp and strip all of the trim pieces in one motion. This feature is particularly attractive from a manufacturing standpoint since the trim or excess may be removed quickly with manual labor.

Articles of the present invention having staggered edges may be prepared by a variety of methods. For example, the various sheets making up the article are first cut to the desired size and shape and are then stacked upon one another to form an article of the present invention having a staggered edge. In a preferred method, the stack of sheets is first prepared and cuts are then made in the stack of sheets at the desired location and at the proper depth to provide a staggered edge. Following the cutting operation, the trim pieces are preferably removed to provide the staggered edge. Suitable methods for cutting the stack of sheets to form a staggered edge include, for example, die cutting with a steel rule die, laser cutting, or water jet cutting. A preferred cutting method utilizes an 80–500W, slow flow $CO_2$ laser such as that commercially available under the trade designation "EAGLE LASER" from Laser Machining Inc., Somerset, Wis. The intensity of the laser may be adjusted to provide the desired depth of cut into the stack of sheets for forming the staggered side edge. When laser cutting, it may be desirable to cover the surface of the stack of sheets with a removable premask to prevent the unwanted deposition of smoke and deris from the cutting process on the surface of the stack of sheets.

Test Methods

Penetration Resistance

A white painted steel panel from Advanced Coating Technologies in Hillsdale Mich. is used as a base. A 50 mm×150 mm test sample is secured to the painted surface of the steel panel using a 100 mm×50 mm piece of No. 232 Scotch™ Masking Tape from 3M Company along the long edges of the sample such that a 125 mm×50 mm portion of the sample is in direct contact with the painted panel. (In the case of a sheet or stack of sheets the exposed adhesive layer is placed in contact with the painted panel.) The panel with the sample on the top surface is placed onto an electronic balance with a capacity of 20 kg. The balance is tared to the combined weight of the panel and sample. Using a stainless steel coated industrial single edge razor blade, apply a force of 0.5 kg to the test sample and hold for 2 seconds. Remove the blade from the test sample and repeat identically the force application and removal at a site 0.5 cm away from the original test site. Repeat the force application and removal at a site 0.5 cm away from the second site and at least 0.5 cm away from the first site to thus obtain 3 replicates at this force level. Color each force application test area with a black Sharpie™ felt tipped permanent marker from the Sanford Corp. The ink will flow through a penetrated area of the test sample and produce a mark on the white metal panel. Remove the test sample from the base panel and observe any marks on the base panel. If no marks are present the sample has passed the test. If any marks are present the sample has failed the test. Repeat the test using the following forces in the test: 1 kg, 1.5 kg, 2 kg, 2.5 kg, 3 kg, 3.5 kg, and 4 kg. The force required to penetrate the sample is recorded.

Effect of Sample on Visual Acuity of Observer

An observer with 6 meter/6 meter vision is positioned 3 meters from a 3 Meter Snellen eye chart, covers one eye and read with the uncovered eye the line which corresponds to 6 meter/6 meter vision. The observer will be considered to have 6 meter/6 meter vision if the observer has that vision unaided or has that vision with corrective lenses as long as the corrective lenses are worn during the testing. A 75 mm×75 mm sample of the article or material to be evaluated is then placed 3 centimeters in front of the observer's uncovered eye while the other eye remains covered to determine if the sample causes a loss of visual acuity. If the sample has a protective release liner, the release liner is removed prior to conducting the test. If the viewer can still read the line of letters indicative of 6 meter/6 meter vision it is considered that there is no interference with visual acuity caused by the sample. If the line indicative of 6 meter/6 meter vision cannot still be read the smallest line which can still be read is recorded, (For example 6 meter/9 meter, 6 meter/12 meter, 6 meter/15 meter, 6 meter/18 meter, etc.).

Appearance After 120 hours at 23° C. and 180 Degree Peel Adhesion Between a Bonding Layer of a Sheet and the Surface of an Adjacent Supported Film A supported film is prepared as follows. A 105 mm×305 mm piece of 467 VHB™ Transfer Adhesive from 3M Company is removed from a roll. The transfer adhesive is an acrylic adhesive coated on a paper liner where both surfaces of the paper liner were treated with a differential silicone release such that the adhesive releases from one side of the liner easier than the other side. The sheet of transfer adhesive was laminated with a rubber roller to the entire surface of a 100 mm×300 mm rectangular painted white metal panel from Advanced Coatings Technology of Hillsdale, Mich. The release liner is removed from the transfer tape exposing the adhesive on the entire surface of the metal panel. To the adhesive is applied a 110 mm×320 mm film in such a way that film/adhesive/panel laminate is free of bubbles. The film is applied to the panel such that the release surface (the release layer or the surface of the first side of the film if there is no release layer present) is on the opposite surface of the film from the adhesive coated panel. Any excess film and adhesive was trimmed away.

To this panel supported film is laminated a 25 mm×150 mm sample of the sheet to be tested. (The sheet to be tested typically comprises a film with a bonding layer coated on one surface thereof.) The sample sheet is bonded to the panel supported film via its bonding layer. A rubber roller is used and in such a way that 100 mm of the sheet is bonded onto the panel supported film and 50 mm of the sheet hangs freely over the edge of the panel supported film. This assembly is allowed to dwell for 120 hours at room temperature and about 50 % relative humidity (R.H.).

The over-hanging edge of the sample sheet is clamped to a sensor of a Slip-Peel Tester Model SP-102C-3090 adhesion tester (IMASS Inc. Accord, Mass.). The rest of the assembly is firmly clamped onto a carriage of the Slip-Peel Tester. As the carriage moves upon operation of the tester the sheet sample is peeled from the panel supported film at a rate of 228.6 cm/min and at an angle of 180 degrees. The average force required to remove the sheet sample from the panel-supported film over a 2-second test period is recorded. The test was conducted at about 23° C. and about 50% relative humidity.

Typical 180 degree peel adhesion values for a sheet of the article of the invention range from about 50 to about 2000 g/2.54 cm. The 180 degree peel adhesion values at the lower end of the range facilitate easy stripping of one sheet from another sheet. The 180 degree peel adhesion values at the upper end of the range make stripping of the sheets more challenging but the integrity of the stack (the ability of the stack to resist premature separation) can be maintained better when vandals scratch the surface of the stack. The preferred 180 degree peel adhesion range is about 500 to about 1500 g/2.54 cm. The most preferred 180 degree peel adhesion range is about 750 to about 1250 g/2.54 cm.

Appearance After Heat Aging and 180 Degree Peel Adhesion Between a Bonding Layer of a Sheet and the Surface of an Adjacent Supported Film The 180 degree peel adhesion force between a bonding layer on a sheet sample and the surface of an adjacent supported film is evaluated as described in the test method entitled "180 Degree Peel Adhesion Between a Bonding Layer of a Sheet and the Surface of an Adjacent Supported Film" except the assembly is aged for 5 days at 80° C. The assembly is examined for discoloration, blistering, and adhesive residue. Preferably the test sample is not discolored or blistered. The test sample is allowed to equilibrate to room temperature for 2 hours prior to testing. The test was conducted at about 23° C. and 50% relative humidity.

The 180 degree peel adhesion value of a sheet of the article of the invention should preferably be stable compared to the room temperature adhesion value measured according to the test entitled "Appearance After 120 hours at 23° C. and 180 Degree Peel Adhesion Between a Bonding Layer of a Sheet and the Surface of an Adjacent Supported Film". The 180 degree peel adhesion after heat aging preferably should not increase more than about 50% and should not decrease more than about 25%. The test sample preferably leaves no residue such as adhesive residue upon removal.

Appearance After Continuous Exposure to Condensing Humidity and 180 Degree Peel Adhesion Between a Bonding Layer of a Sheet and the Surface of an Adjacent Supported Film The adhesion force between a bonding layer of a sheet and the surface of an adjacent supported film is evaluated as described in the test method entitled "Appearance After 120 hours at 23° C. and 180 Degree Peel Adhesion Between a Bonding Layer of a Sheet and the Surface of an Adjacent Supported Film" except that the assembly is first continuously aged in a chamber that is maintained at 38° C. and 100% relative humidity for 5 days prior to appearance evaluation and 180 degree peel adhesion testing. The assembly is examined for discoloration and blistering. The assembly is allowed to equilibrate to room temperature for 2 hours prior to testing for 180 degree peel adhesion. The test was conducted at about 23° C. and 50% relative humidity.

The 180 degree peel adhesion value of a sheet of the article of the invention should preferably be stable compared to the room temperature 180 degree peel adhesion value as measured according to the test method entitled "Appearance After 120 hours at 23° C. and 180 Degree Peel Adhesion Between a Bonding Layer of a Sheet and the Surface of an Adjacent Supported Film". The level of 180 degree peel adhesion after condensing humidity exposure preferably should not increase more than about 50 % or decrease more than about 25%. The test sample preferably leaves no residue such as adhesive residue upon removal.

Appearance After an Environmental Cycling Test and 180 Degree Peel Adhesion Between a Bonding Layer on a Sheet Sample and the Surface of a Supported Adjacent Film The adhesion force between a bonding layer on a sheet sample and the surface of a supported adjacent film is evaluated as described in the test method entitled "Appearance After 120 hours at 23° C. and 180 Degree Peel Adhesion Between a Bonding Layer of a Sheet and the Surface of an Adjacent Supported Film" except that prior to testing the assembly is first aged in a controlled environmental chamber that is programmed to conduct the following continuous cycle: 4 hours at 40° C./100% relative humidity (RH), followed by 4 hours at 80° C. and then followed by 16 hours at −40° C. The sample is exposed 10 times to this cycle. The sample is examined for discoloration and blistering. Preferably the aged sample does not experience discoloration or blistering. The sample is allowed to equilibrate to room temperature for 2 hours before 180 degree peel adhesion testing. The peel adhesion test was conducted at about 23° C. and about 50% humidity.

The 180 degree peel adhesion value of a sheet of the article of the invention should preferably be stable compared to the room temperature adhesion value as evaluated in the test method entitled "Appearance Alter 120 hours at 23° C. and 180 Degree Peel Adhesion Between a Bonding Layer of a Sheet and the Surface of an Adjacent Supported Film". The level of 180 degree peel adhesion of a sheet of the article of the invention after thermal cycling preferably should not increase more than about 50% or decrease more than about 25%. The test sample preferably leaves no residue such as adhesive residue on removal.

180 Degree Peel Adhesion to Glass

A 100 mm×200 mm flat glass plate is cleaned with toluene and allowed to air dry prior to application of a sheet sample to be tested. (The sheet to be tested typically comprises a film and a bonding layer bonded to one side thereof.) The adhesion to glass is measured by bonding a 25 mm×150 mm of the sheet sample to be tested using a rubber roller such that no trapped air and 25 mm×50 mm of the sheet is hanging over the edge of the glass. The sheet is applied such that the bonding layer of the sheet is in contact with the glass. The sheet is allowed to dwell on the glass at least 10 minutes but less than 60 minutes. The glass plate is clamped onto the carriage of a Slip-Peel Tester Model SP-102C-3090 adhesion tester (IMASS Inc., Accord Mass.). The overhang of the sheet is clamped to a sensor of the tester. As the carriage moves upon operation of the tester the force to peel the sheet is measured at 228.6 cm/min at an angle of 180 degrees. The average force over a 2 second period is recorded. The test is conducted at about 23° C. and about 50% R.H.

Typically the 180 degree peel adhesion to glass of a sheet of an article of the invention is about 100 g/2.54 cm to about 5000 g/2.54 cm, preferably about 500 g/2.54 cm to about 3000 g/2.54 cm, and most preferably about 1500 g/2.54 cm to about 2500 g/2.54 cm. One hundred eighty degree peel adhesion above about 5000 g/2.54 cm is less preferred, because the sheet may be difficult to remove after a prolonged time on the glass. One hundred eighty degree peel adhesion below about 100 g/2.54 cm is less preferred, because the bond to the glass could potentially be disrupted when the individual sheets are removed from the stack.

The glass panel is inspected for residue left after the sheet sample is peeled from the glass. Preferably substantially no residue (such as adhesive residue) remains on the glass. Most preferably no visible residue (such as adhesive residue) remains on the glass. The percentage of the area of the test panel where the sample was initially applied on which any residue remained is recorded.

Haze Test

The haze of a sample is measured by using a Garner XL211 Hazeguard device. The procedure used is in accordance to ASTM D1003-95 with the following exceptions 1. The sample size is rectangular with a minimum size of 40 mm×40 mm.
2. The sample is scanned for areas of the maximum haze. These selected areas are measured and the maximum haze value is reported.
3. The sample is allowed equilibrate at 23° C. and 50% R.H. for 72 hours prior to testing.
4. If printed or embossed images or graphics are contained on the sample, those areas of the sample should be avoided when measuring the maximum haze of the sample.
5. Prior to conducting the haze test, the release liner (if any) is removed from the sample.

Scratch Resistance

A 1.2 kg hammer manufactured by Collins Axe Company is provided. A tungsten carbide tipped stylus from General Tools Manufacturing Co. Inc. New York, N.Y. is taped securely to the very top of the metal head of the hammer such that the tip of the nail points in substantially the same downward direction as does the hitting end of the hammer head. The nail is positioned such that it is substantially perpendicular to the handle of the hammer. The stylus protrudes from the hammer 2.5 cm. The tape used is No 471 tape from 3M Company. The sheet sample is attached to a 100 mm×300 mm white painted metal panel and held securely in place. The hammer is held at the end of the handle while the carbide stylus bears the weight of the hammer. A straight edge is taped to the sheet sample as a guide. The hammer is pulled down the length of the panel at about 200 cm/min such that the weight of the hammer is on the stylus. The hammer is pushed back up the length of the panel. Each up and down motion consisted of one cycle. The number of cycles needed to scratch through the sample and into the white paint is reported.

The scratch resistance of a sheet or a film layer of an article of the invention typically ranges from about 5 to more than about 500 cycles, preferably greater than about 10 cycles, more preferably greater than 50 cycles and most preferably greater than about 100 cycles.

Taber Abrasion Resistance

A 7.5 cm diameter non-abraded circular sample of the material to be tested is cut such that a 1.25 cm hole is provided in the center of the sample. The haze of the non-abraded sample is then measured using a Gardner XL211 Hazeguard system. The Gardner XL211 Hazeguard system is balanced and calibrated to zero using the non-abraded sample. The sample is clamped in a fixture of a Taber abrader. The sample is abraded using the Taber Abrader with CS10 wheels and a 500 gram load for 100 cycles. The haze of the abraded sample is measured using the Gardner XL211 Hazeguard system. The difference in haze of the abraded surface and the non-abraded surface is recorded.

The Taber abrasion resistance value is the percentage difference between the haze value of the abraded sample and the non-abraded sample. Preferably the Taber abrasion resistance of the sample of the material being tested after 100 cycles is less than about 25 percent, more preferably less than about 10 percent, and most preferably less than about 2 percent.

EXAMPLES

The present invention will be better understood by referring to the following non-limiting examples. All parts, percentages, ratios, etc. in the examples are by weight unless indicated otherwise.

Example 1

A bonding material solution comprising 96 parts by weight of isooctyl acrylate and 4 parts by weight of acrylamide was prepared in a 50% heptane/50% ethyl acetate solution using 2,2'-azobis(isobutyronitrile) free radical initiator available under the trademark "VAZO" 64 from the E.I. DuPont Company, of Wilmington, Del.

The following components were added to a reaction vessel: 19.2 kg of isooctyl acrylate, 0.8 kg of acrylamide, 40 kg of heptane and 40 kg of ethyl acetate. While constantly stirring under a nitrogen atmosphere and controlling the temperature between 70–100° C., 270 grams of VAZO™ 64 was added to the vessel in three 90-gram increments. The resulting polymer had a conversion of 98%. The Brookfield viscosity was measured (#3 spindle at 12 rpm) at 2000–2800 cps at a solids level of 19–23%. The inherent viscosity of the polymer was 1.25–1.40 dl/gram.

A first sheet of film with a tacky bonding layer was prepared by coating the bonding material solution onto a second surface of a 15 cm×100 cm×125 micron thick optically clear biaxially oriented corona treated polyester film using a knife coater at a wet thickness of 175 microns. The second surface of the film was the corona treated surface of the film. The coated film was dried in an air convection oven for 10 minutes at 82° C. The dry thickness of the coating of the coated film was 20–25 microns. The tacky bonding layer of this first sheet was protected by laminating an optically clear silicone coated polyester film to the tacky bonding layer. The silicone coated polyester film was 1–2 PESTRD (P1)-7200 available from DCP Lohja Inc. of Lohja Calif. The surface opposite the bonding layer coated surface of the film will be referred to herein as the release surface.

A second sheet of film with a tacky bonding layer was prepared in a similar manner. The bonding layer of the second sheet was laminated to the release surface of the first sheet using a laminator with a steel roll and a rubber backup roll having a shore A hardness of 75 at a pressure of 32 N/cm² such that the bonding layer of the second sheet was in contact with the release surface of the first sheet. This sheet preparation and lamination process was repeated until a stack of four sheets was completed.

Example 2

Example 2 was identical to Example 1 except that the corona treated polyester film was 170 microns in thickness.

Example 3

Example 3 was identical to Example 1 except that the corona treated polyester film was 75 microns in thickness.

Example 4

Example 4 was identical to Example 1 except that the corona treated polyester film was 250 microns in thickness and the size of the corona treated polyester film was 15 cm×25 cm.

Example 5

Example 5 was identical to Example 1 except that a sufficient number of sheets were made and laminated together until a stack of 10 sheets was prepared.

Example 6

Example 6 was identical to Example 1 except that the film onto which the bonding material solution was coated was a 175 micron polyester film with a hard coating on the first surface which served as the release layer. This film and coating was obtained from the Furon Corporation of Worcester, Mass. under the product name 007/PET/0270x Hard coat. In addition, the side of the film opposite the release layer was corona treated prior to coating with the bonding material described in Example 1.

Example 7

A polished 22 cm×28 cm×250 micron thick film of clear transparent polycarbonate was obtained from General Electric under the tradename Lexan™ FR60. The film had a first surface and an opposite second surface. The film was coated on its first surface with a solution of 3M 906 hard coat, an acid-resistant acrylic based protective coating available from 3M Company, St Paul, Minn. in order to provide a release layer and an abrasion resistant surface on one side of the film. The coating solution was made by diluting to 16% solids 906 hard coat with a 50/50 mixture of isopropanol and n-butanol. To 100 grams of the diluted hardcoat solution, 0.075 gram of a leveling agent Dow 57, an alkoxy terminated polysilicone available from Dow Corning of Midland, Mich. was added. The coating was applied with a syringe to the first surface of the film in a vertical position approximately 10 microns wet. The sheet was dried 10 minutes at 82 degrees C. The coating on the film was cured with a 300 Watt high pressure mercury vapor lamps at a belt speed of approximately 30 meters per minute. The reflective parabolic lamp housing focused the light source on the coating. The curing unit was Model II 180133 AN from RPC Industries of Plainview, Ill. The resulting thickness of the hard coat was 1–2 microns.

A bonding material was prepared from 96 parts by weight of isooctyl acrylate and 4 parts by weight of acrylamide in a 50% heptane/50% ethyl acetate solution using VAZO™ 64 initiator as follows.

To a reaction vessel the following materials were added: 19.2 kg of isooctyl acrylate, 0.8 kg of acrylamide, 40 kg of heptane and 40 kg of ethyl acetate. While constantly stirring under a nitrogen atmosphere and controlling the temperature between 70–100° C., 270 grams of VAZO™ 64 was added to vessel in three 90 gram increments. The resulting polymer solution had a conversion of 98%. The Brookfield viscosity was measured (#3 spindle at 12 rpm) at 2000–2800 cps at a solids level of 20%. The inherent viscosity of the polymer solution was 1.40 dl/gram.

The polymer solution was coated on 15 cm×30 cm×50 micron thick optically clear biaxially oriented silicone coated optically clear polyester film (transfer film) using a knife coater at a wet thickness of 175 microns. The silicone coated polyester was 1–2 PESTRD (P1)-7200 from DCP Lohja Inc. of Lohja Calif. The coated film was dried in an air convection oven for 10 minutes at 82° C. in order to form a transfer tape. The dry thickness of the coated layer was 20–25 microns. The coating was considered to be a bonding layer. The transfer tape was laminated to the non-hard coated surface of the Lexan™ FR60 sheet via the bonding layer of the transfer tape. Any excess Lexan™ FR60 sheet and transfer tape were trimmed so that the trimmed laminate had areas with complete coating of the bonding layer. Four of these trimmed laminates were prepared.

A stack of sheets was produced by removing the optically clear polyester release film from the bonding layer of the first trimmed laminate and laminating it to the release coated surface of the second trimmed laminate using a laminator with a steel roll and a rubber backup roll with a shore A hardness of 75 at a pressure of 32 N/cm$^2$. The optically clear polyester release film was removed from the third trimmed laminate and the third trimmed laminate was laminated to the release coated surface of the first two trimmed laminates. This was repeated until a stack of four trimmed laminates was produced.

Example 8

Example 6 was repeated except the bonding layer was comprised of polyhexene. The film onto which the bonding material layer was coated was a 175 micron thick optically clear polyester with a 0270x hard coat as described in Example 6 from the Furon Corporation of Worcester, Mass.

A bonding material was prepared using a polyhexene with an inherent viscosity of 3.0 dl/gram. The polyhexene was prepared using a process described in U.S. Pat. No. 5,644,007 issued on Jul. 1, 1997 and assigned to 3M Company. The polyhexene was prepared using 0.2–0.3 g of a Ziegler-Natta catalyst Lynx™ 715 per kg of monomer. Lynx™ 715 is TiCl$_4$ supported on MgCl$_2$ powder which is commercially available from Catalyst Resources Inc. This catalyst is discussed in Boor, *Ziegler-Natta Catalysts and Polymerizations*, "Polymerization of Monomers," Ch. 19, pp. 512–562, *Academic*. The conversion rate was 15%. The bonding material was coated on the surface of the film opposite the release layer of the film.

Comparative Example 9

Four layers of Scotch™ 375 packaging tape from 3M Company in St. Paul, Minn. were laminated together using a laminator with a steel roll and a rubber backup roll with a shore A hardness of 75 at a pressure of 32 N/cm$^2$. Each layer of tape was 10 cm×15 cm and comprised a 50 micron biaxially oriented polypropylene backing and a 37 micron rubber based adhesive coated on one surface thereof. The adhesive on the bottom sheet of the stack was protected by a silicone coated optically clear polyester release liner. The polyester release liner was 1–2 PESTRD(P1)-7200 from DCP Lohja Inc. of Lohja Calif. The liner was removed from each tape and the tapes were laminated together such that the adhesive layer of one tape was in contact with the film layer of the tape below except for the bottom piece of tape.

Example 1–8 and Comparative Example 9 were subjected to various tests. The tests and the results obtained are reported in the table below.

TABLE

|  | Example 1 | Example 2 | Example 3 | Example 4 | Example 5 | Example 6 | Example 7 | Example 8 | Comparative Example 9 |
|---|---|---|---|---|---|---|---|---|---|
| 1. Effect of Sample of Visual Acuity (meter/meter) | 6/6 | 6/6 | 6/6 | 6/6 | 6/6 | 6/6 | 6/6 | 6/6 | 6/12 |
| 2. Penetration Resistance (kg) | 1.0 | 1.0 | 0.5 | 1.5 | 1.0 | 1.0 | 1.5 | 1.5 | 0.5 |

TABLE-continued

|  | Example 1 | Example 2 | Example 3 | Example 4 | Example 5 | Example 6 | Example 7 | Example 8 | Comparative Example 9 |
|---|---|---|---|---|---|---|---|---|---|
| 3. Taber Abrasion Resistance (% haze difference between abraded and non abraded samples after 100 cycles of abrasion on a Tabor Abrader) | 18 | 18 | 18 | 18 | 18 | 2 | 2 | 0.3 | 17 |
| 4. Scratch Resistance (Cycles) | 59 | 110 | 10 | 208 | 59 | 115 | 125 | 115 | 3 |
| 5. Haze % | 3.8 | 2.8 | 2.3 | 4.1 | 3.3 | 2.9 | 3.0 | 2.9 | 7.5 |
| 6a. Appearance After 120 hours at 23° C. and 180 Degree Peel Adhesion between a Bonding Layer of a Sheet and the Surface of an Adjacent Supported Film. (grams/2.54 cm) | 735 | 585 | 940 | Not tested | 735 | 207 | 889 | 73 | 207 |
| 6b. Appearance of sample after 120 hours at 23° C. and observations of the surface where sheet was removed. (No change = no residue on removal, no blisters in the sample and no discoloration) | No change | No change | No change | Not tested | No change | No change | No change | No change | No change |
| 7a. Appearance after Heat Aging (120 hours at 23° C.) and 180 Degree Peel Adhesion Between a Bonding Layer of a Sheet and the Surface of an Adjacent Supported Film. (g/2.54 cm) | 833 | 695 | 980 | Not tested | 833 | 683 | 889 | 132 | 683 |
| 7b. Appearance of sample after 120 hours at 80° C. and observation of surface where sheet was removed. (No change = no residue on removal, no blisters in the sample and no discoloration) | No change | No change | No change | Not tested | No change | 5% residue small blisters no discoloring | 15% residue large blisters no discoloring | No change | 5% residue small blisters no discoloring |
| 8a. Appearance After Continuous Exposure to Condensing Humidity (120 hours at 33° C. and 100% R.H.) and 180 Degree Peel Adhesion between a Bonding Layer of a Sheet and the Surface of an Adjacent Supported Film. (g/2.54 cm) | 865 | 685 | 1025 | Not tested | 865 | 268 | 927 | 69 | 268 |
| 8b. Appearance of sample after 120 hours at 38° C./100% RH and observation of surface where sheet was removed. (No change = residue on removal, no blisters in the sample and no discoloration). | No change | No change | No change | Not tested | No change | No change | Small blisters | No change | No change |
| 9a. Appearance After an Environmental Cycling Test and 180 Degree Peel Adhesion between a Bonding Layer on a Sheet Sample and the Surface of a Supported Adjacent Film. Adhesion between sheets after 5 thermal cycles (g/2.54 cm) One thermal cycle consists of 4 hours at 80° C., 4 hours at 38° C. and 100% R.H. and 16 hours at −40° C. | 815 | 655 | 1120 | Not tested | 815 | 357 | 575 | 73 | 357 |
| 9b. Appearance of sample after 5 thermal cycles and observation of surface where sheet was removed. (No change = no residue on removal, no blisters in the sample and no discoloration). | No change | No change | No change | Not tested | No change | 5% residue small blisters no discoloring | 15% residue large blisters no discoloring | No change | 5% residue small blisters no discoloring |

The foregoing detailed description and Examples have been given for clarity of understanding only. No unnecessary limitations are to be understood therefrom. The complete disclosures of all patents, patent applications, and publications are herein incorporated by reference as if individually incorporated. Various modifications and alterations of this invention will become apparent to those skilled in the art from the foregoing description without departing from the scope and the spirit of this invention, and it should be understood that this invention is not to be unduly limited to the illustrative embodiments set fourth herein.

What is claimed is:

1. An article comprising:
    a stack of sheets, each sheet having a first side surface, an opposite second side surface, and a side edge, and wherein each sheet independently comprises:
    (a) a film, the film having a first side having a surface area, an opposite second side surface having a surface area;
    (b) a bonding layer having a first side having a surface area and an opposite second side having a surface area, wherein the bonding layer is bonded via its first side to the second side of the film such that at least a center of the surface area of the second side of the film is in contact with the bonding layer, wherein at least about 50 percent of the surface area of the second side of the film has the bonding layer bonded thereto;
    wherein each sheet is stacked upon another sheet such that except for a bottom sheet of the stack of sheets, the bonding layer of a sheet is in contact with the film of a sheet below;
    wherein at least a portion of the side edges of the sheets are disposed in a vertically staggered arrangement relative to one another thereby forming a vertically staggered side edge having a staircase or reverse staircase configuration, wherein the vertically staggered side edge includes at least one indexing surface; and wherein the bonding layer of each sheet extends to the vertically staggered side edge;
    wherein a topmost sheet can be removed from the stack of sheets by pulling it away from the stack such that the sheet being removed from the stack as well as the sheets remaining with the stack do not delaminate;

wherein the stack of sheets when subjected to a visual acuity test using a 3 meter Snellen eye chart allows an observer with 6 meter/6 meter vision to read a line on the eye chart which is indicative of about 6 meter/9 meter vision or better.

2. The article of claim 1 wherein when subjected to a visual acuity test using a 3 meter Snellen eye chart allows an observer with 6 meter/6 meter vision to read the line on the eye chart which is indicative of about 6 meter/6 meter vision or better.

3. The article of claim 1 wherein the stack of sheets is transparent.

4. The article of claim 1 wherein each sheet has a penetration resistance of at least about 0.5 kg.

5. The article of claim 1 which comprises at least about 3 sheets.

6. The article of claim 1 wherein the film has a thickness ranging from about 25 to about 4000 microns.

7. The article of claim 1 wherein the film comprises multiple layers.

8. The article of claim 1 wherein the vertically staggered side edge is located at an edge of said article.

9. The article of claim 1 wherein the vertically staggered side edge is located at a corner of said article.

10. The article of claim 1 wherein the indexing surfaces have a shape selected from the group consisting of crescent shaped, rectangular, semicircular, and trapezoidal.

11. The article of claim 1 wherein the vertically staggered side edge is positioned at a corner of said article and wherein the indexing surfaces are crescent shaped having one concave edge and one convex edge.

12. The article of claim 1 wherein the vertically staggered side edge has a width ranging from about 0.5 mm to 25.0 mm.

13. The article of claim 1 wherein the vertically staggered side edge has a length ranging from about 1 cm to 50 cm.

14. The article of claim 1 wherein the vertically staggered side edge is in a staircase configuration.

15. The article of claim 1 wherein the vertically staggered side edge is in a reverse staircase configuration.

16. The article of claim 1 further including a release layer coated on the first side of the film; wherein each sheet is stacked upon another sheet such that except for a bottom sheet of the stack of sheets, the bonding layer of a sheet is in contact with the release layer of a sheet below.

17. A construction comprising:
(i) an article comprising: a stack of sheets, each sheet having a first side surface, an opposite second side surface, and a side edge, and wherein each sheet independently comprises:
   (a) a film, the film having a first side having a surface area, an opposite second side surface having a surface area;
   (b) a bonding layer having a first side having a surface area and an opposite second side having a surface area, wherein the bonding layer is bonded via its first side to the second side of the film such that at least a center of the surface area of the second side of the film is in contact with the bonding layer, wherein at least about 50 percent of the surface area of the second side of the film has the bonding layer bonded thereto;
   wherein each sheet is stacked upon another sheet such that except for a bottom sheet of the stack of sheets, the bonding layer of a sheet is in contact with the film of a sheet below;
   wherein at least a portion of the side edges of the sheets are disposed in a vertically staggered arrangement relative to one another thereby forming a vertically staggered side edge having a staircase or reverse staircase configuration, wherein the vertically staggered side edge includes at least one indexing surface; and wherein the bonding layer of each sheet extends to the vertically staggered side edge;
   wherein a topmost sheet can be removed from the stack of sheets by pulling it away from the stack such that the sheet being removed from the stack as well as the sheets remaining with the stack do not delaminate;
   wherein the stack of sheets when subjected to a visual acuity test using a 3 meter Snellen eye chart allows an observer with 6 meter/6 meter vision to read a line on the eye chart which is indicative of about 6 meter/9 meter vision or better; and
(ii) a substrate to which the article is bonded via the bonding layer of the bottom sheet.

18. The construction of claim 17 wherein the substrate comprises a material selected from the group consisting of glass, metal, plastic, painted surfaces, wood, fabric, wallpaper, ceramic, concrete, mirrored surfaces, plastic/glass laminates, and combinations thereof.

19. The construction of claim 17 wherein the substrate is part of a structure.

20. The construction of claim 19 wherein the structure is selected from the group consisting of windows, walls, partitions, signs, bill boards, artwork, buildings, elevators, vehicles, furniture, and doors.

21. The construction of claim 20 wherein the structure comprises a window.

22. The construction of claim 20 wherein the structure comprises a vehicle comprising a window; and wherein the article is bonded via the bonding layer of the bottom sheet to the window.

23. The construction of claim 22 wherein the vehicle is selected from the group consisting of buses, trains, and subways.

* * * * *

UNITED STATES PATENT AND TRADEMARK OFFICE
CERTIFICATE OF CORRECTION

PATENT NO.       : 6,777,055 B2
APPLICATION NO. : 10/685329
DATED            : August 17, 2004
INVENTOR(S)     : Jeffrey R. Janssen It is certified that error appears in the above-identified patent and that said Letters Patent is hereby corrected as shown below:

Column 1,
Line 11, delete "2000 now abandoned" and insert in place thereof
-- 2000, now abandoned, --.

Column 7,
Line 48, delete "comer" and insert in place thereof -- corner --.

Column 8,
Line 59, insert -- . -- following "heat".

Column 10,
Line 3, delete "thereof," and insert in place thereof -- thereof; --.
Lines 41, 42, delete "2,3,4-butanetetrol" and insert in place thereof
-- 1,2,3,4-butanetetrol --.

Column 13,
Line 16, delete "comer" and insert in place thereof -- corner --.
Line 19, delete "comer" and insert in place thereof -- corner --.

Column 14,
Line 14, delete "comer" and insert in place thereof -- corner --.
Line 39, delete "comer" and insert in place thereof -- corner --.
Line 42, delete "comers" and insert in place thereof -- corners --.

Column 15,
Line 4, delete "comer" and insert in place thereof -- corner --.

Column 17,
Line 64, delete "Laver" and insert in place thereof -- Layer --.

Column 18,
Line 18, delete "Alter" and insert in place thereof -- After --.

Column 21,
Line 4, delete "007/PET" and insert in place thereof -- 007 PET --.

UNITED STATES PATENT AND TRADEMARK OFFICE
CERTIFICATE OF CORRECTION

PATENT NO. : 6,777,055 B2
APPLICATION NO. : 10/685329
DATED : August 17, 2004
INVENTOR(S) : Jeffrey R. Janssen It is certified that error appears in the above-identified patent and that said Letters Patent is hereby corrected as shown below:

Column 23,
Line 57, delete "fourth" and insert in place thereof -- forth --.

Signed and Sealed this

Ninth Day of January, 2007

JON W. DUDAS
*Director of the United States Patent and Trademark Office*